United States Patent
Kubota et al.

(10) Patent No.: US 11,140,600 B2
(45) Date of Patent: *Oct. 5, 2021

(54) SERVICE-BASED, SEPARATED ACCESS AND PAGING CELL SELECTION AND RESELECTION

(71) Applicant: QUALCOMM Incorporated, San Diego, CA (US)

(72) Inventors: Keiichi Kubota, Tokyo (JP); Gavin Bernard Horn, La Jolla, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/206,715

(22) Filed: Nov. 30, 2018

(65) Prior Publication Data

US 2019/0104456 A1    Apr. 4, 2019

Related U.S. Application Data

(63) Continuation of application No. 15/017,440, filed on Feb. 5, 2016, now Pat. No. 10,149,217.

(Continued)

(51) Int. Cl.
*H04W 36/16* (2009.01)
*H04W 36/30* (2009.01)
(Continued)

(52) U.S. Cl.
CPC ......... *H04W 36/165* (2013.01); *H04W 36/30* (2013.01); *H04W 48/18* (2013.01);
(Continued)

(58) Field of Classification Search
CPC ... H04W 36/165; H04W 48/18; H04W 48/20; H04W 74/00; H04W 68/02; H04W 36/30;
(Continued)

(56) References Cited

U.S. PATENT DOCUMENTS 9,084,184 B2 * 7/2015 Chin .................... H04W 48/18
2006/0189331 A1 * 8/2006 Lundsjo ................ H04W 68/12
455/435.2

(Continued)

FOREIGN PATENT DOCUMENTS

EP         2814297 A1    12/2014
WO   WO-2011028258 A2    3/2011
(Continued)

OTHER PUBLICATIONS

International Search Report and Written Opinion—PCT/US2016/045866—ISA/EPO—Nov. 15, 2016.

*Primary Examiner* — Marcus Hammonds
(74) *Attorney, Agent, or Firm* — Dang M. Vo

(57) ABSTRACT

Systems and techniques are disclosed to separate paging and access cell selection (and use) among available cells based on different paging cell and access cell requirements and specific service availability. A UE selects a first cell that meets paging cell requirements as a paging cell and a second cell that meets service requirements as an access cell. Once the UE selects a paging cell, the UE camps on the paging cell to wait for a paging request or a mobile originated request. The UE can select and camp on the access cell prior to a data need, where latency requirements are strict, or delay access cell selection until there is data to transmit where latency requirements are more lax. The UE may also include measurement information of surrounding cells with a paging response/service request, which a core network uses to speed up establishment of dual connectivity or carrier aggregation.

30 Claims, 10 Drawing Sheets

Related U.S. Application Data

(60) Provisional application No. 62/213,021, filed on Sep. 1, 2015.

(51) Int. Cl.
| | | |
|---|---|---|
| *H04W 74/00* | (2009.01) | |
| *H04W 68/02* | (2009.01) | |
| *H04W 48/18* | (2009.01) | |
| *H04W 68/12* | (2009.01) | |
| *H04W 76/10* | (2018.01) | |

(52) U.S. Cl.
CPC ........... *H04W 68/02* (2013.01); *H04W 74/00* (2013.01); *H04W 68/12* (2013.01); *H04W 76/10* (2018.02)

(58) Field of Classification Search
CPC ..... H04W 76/02; H04W 68/12; H04W 88/06; H04W 76/10
See application file for complete search history.

(56) References Cited

U.S. PATENT DOCUMENTS

| | | | |
|---|---|---|---|
| 2009/0197570 A1* | 8/2009 | Horn | H04W 48/08 |
| | | | 455/410 |
| 2010/0317375 A1 | 12/2010 | Burbidge et al. | |
| 2011/0319073 A1* | 12/2011 | Ekici | H04W 48/18 |
| | | | 455/426.1 |
| 2013/0235761 A1* | 9/2013 | Nanda | H04W 48/20 |
| | | | 370/254 |
| 2014/0378143 A1* | 12/2014 | Li | H04W 72/0413 |
| | | | 455/437 |
| 2016/0286449 A1* | 9/2016 | Choi | H04W 36/28 |
| 2016/0286523 A1* | 9/2016 | Yu | H04W 48/16 |
| 2017/0064601 A1 | 3/2017 | Kubota et al. | |

FOREIGN PATENT DOCUMENTS

| | | |
|---|---|---|
| WO | WO-2014153683 A1 | 10/2014 |
| WO | WO-2015018032 A1 | 2/2015 |

\* cited by examiner

SERVICE-BASED, SEPARATED ACCESS AND PAGING CELL SELECTION AND RESELECTION

CROSS REFERENCE TO RELATED APPLICATIONS

The present application is a continuation of U.S. patent application Ser. No. 15/017,440, filed Feb. 5, 2016, which claims priority to and the benefit of the U.S. Provisional Patent Application No. 62/213,021, filed Sep. 1, 2015, each of which is hereby incorporated by reference in its entirety.

TECHNICAL FIELD

Aspects of the present disclosure relate generally to wireless communication systems, and more particularly, to the separation of paging and access cell selection among available cells based on different paging cell and access cell service requirements and specific service availability. Enabling and providing techniques to allow a user equipment (UE) to be able to select and reselect both paging and access cells based the availability of a cell to support a particular requirement and/or service can ensure appropriate network connections are made and sustained, improve latency issues, establish faster network connections, improve overall UE connectivity, and improve user experiences in a variety of use cases and deployment scenarios.

INTRODUCTION

In wireless communication networks, a user equipment (UE) selects or reselects a serving cell in idle mode based on the radio conditions and public land mobile network (PLMN) information of a network access node, such as a base station. However, for new and developing services (e.g., industrial automation, self-driving cars, etc.) that require ultra-low latency (e.g., ~1 ms round trip time (RTT) or less) and highly reliable communication connections, the use of radio conditions and PLMN information may not be sufficient to ensure that the latency and reliability requirements necessary for proper implementation of the service are met.

Further, the UE typically selects the serving cell to provide multiple functionalities, including paging functionality and network access functionality. In other words, paging and access are currently coupled together such that the UE will perform access to the network in the same cell in which it is paged from the network. But, again, for new and developing services the service requirements for paging may differ from the service requirements for network access. For example, the UE may require that paging be on a reliable radio access technology (RAT) so that the UE is sure to be reachable. In contrast, the service for which the UE requires network access may demand high throughput, such that a high throughput cell and/or RAT may be required. These requirements for paging and network access can be at odds, however, since a high throughput RAT may not be suitable for reliable paging, and a RAT that provides reliable paging similarly may not be suitable for high throughput.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method is provided that includes determining, by a user equipment (UE), a paging service requirement and an access service requirement for a service to use in communication with a network. The method further comprises selecting, by the UE, a first cell through which the UE receives a paging service from a base station based on the paging service requirement. The method further comprises selecting, by the UE, a second cell through which the UE obtains the service based on the access service requirement.

In an additional aspect of the disclosure, a method is provided that includes sending, from a network, a paging signal to a user equipment (UE) via first cell on which the UE is camped. The method further comprises receiving, at the network, a paging response from the UE via a second cell on which the UE is camped in response to the paging signal received via the first cell, the second cell being different from the first cell. The method further comprises establishing, by the network, a data connection with the second cell in response to the received paging response to communicate with the UE via the second cell.

In an additional aspect of the disclosure, an apparatus is provided that includes a processor configured to determine a paging service requirement and an access service requirement for a service to use in communication with a network, select a first cell through which the apparatus receives a paging service from a base station based on the paging service requirement, and select a second cell through which the apparatus obtains the service based on the access service requirement. The apparatus further includes a transceiver configured to camp on the first cell and camp on the second cell after their respective selection.

In an additional aspect of the disclosure, a network system is provided that includes a first node configured to send a paging signal to a user equipment (UE) via first cell on which the UE is camped, and receive a paging response from the UE via a second cell on which the UE is camped in response to the paging signal received via the first cell, the second cell being different from the first cell. The network system further includes a second node configured to establish a data connection with the second cell in response to the received paging response to communicate with the UE via the second cell.

In an additional aspect of the disclosure, a computer readable medium having program code recorded thereon is provided, the program code including code for causing a user equipment (UE) to determine a paging service requirement and an access service requirement for a service to use in communication with a network. The program code further includes code for causing the UE to select a first cell through which the UE receives a paging service from a base station based on the paging service requirement. The program code further includes code for causing the UE to select a second cell through which the UE obtains the service based on the access service requirement.

In an additional aspect of the disclosure, a computer readable medium having program code recorded thereon is provided, the program code including code for causing a network to send a paging signal to a user equipment (UE) via first cell on which the UE is camped. The program code further includes code for causing the network to receive a paging response from the UE via a second cell on which the UE is camped in response to the paging signal received via the first cell, the second cell being different from the first cell. The program code further includes code for causing the network to establish a data connection with the second cell in response to the received paging response to communicate with the UE via the second cell.

In an additional aspect of the disclosure, an apparatus is provided that includes means for determining, by a user equipment (UE), a paging service requirement and an access service requirement for a service to use in communication with a network. The apparatus further includes means for selecting, by the UE, a first cell through which the UE receives a paging service from a base station based on the paging service requirement. The apparatus further includes means for selecting, by the UE, a second cell through which the UE obtains the service based on the access service requirement.

In an additional aspect of the disclosure, a network system includes means for sending, from the network system, a paging signal to a user equipment (UE) via first cell on which the UE is camped. The network system further includes means for receiving, at the network system, a paging response from the UE via a second cell on which the UE is camped in response to the paging signal received via the first cell, the second cell being different from the first cell. The network system further includes means for establishing, by the network system, a data connection with the second cell in response to the received paging response to communicate with the UE via the second cell.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
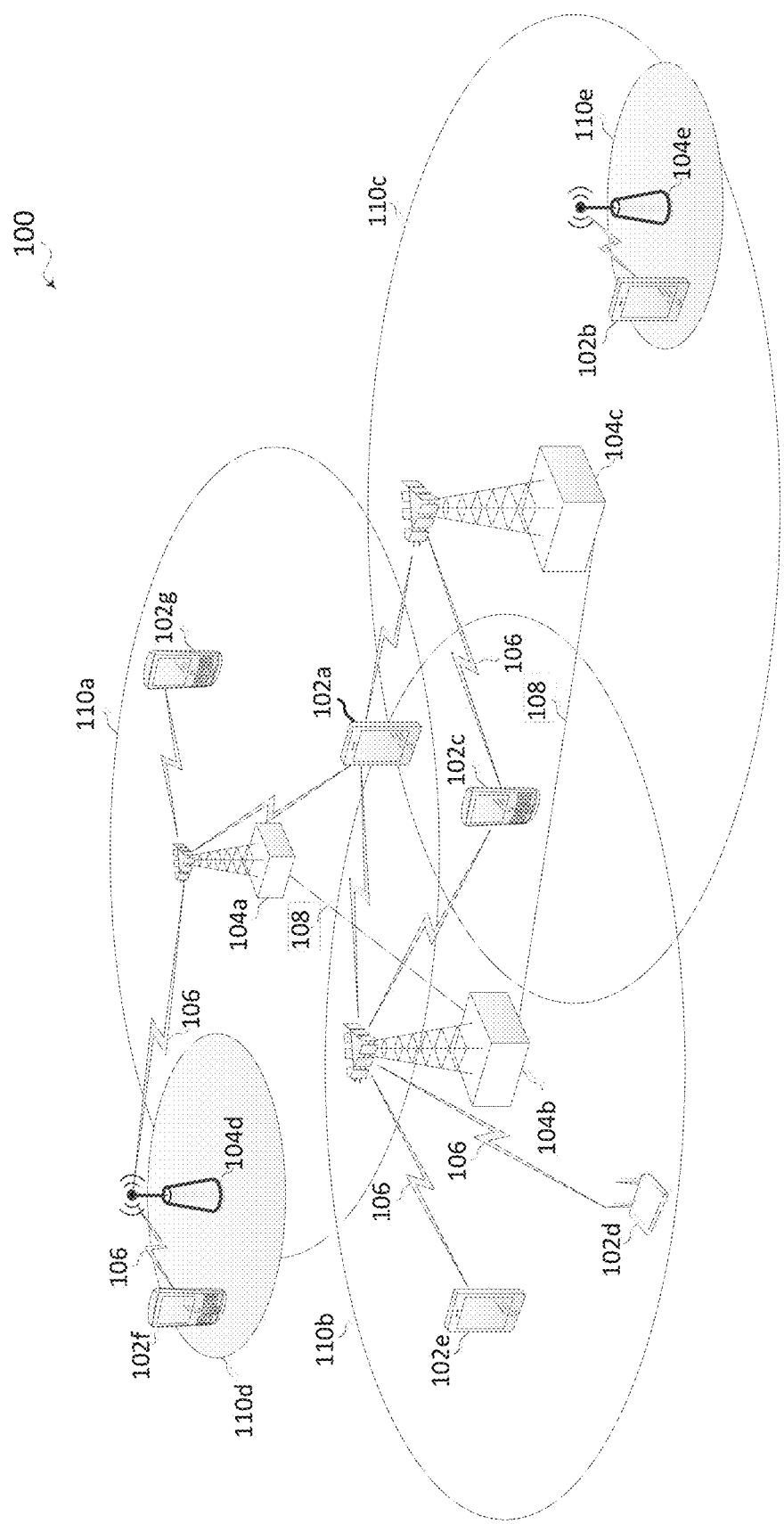
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA, LTE networks, GSM networks, and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) network. Embodiments of this disclosure are directed to any type of modulation scheme that may be used on any one or more of the above-recited networks and/or those yet to be developed.

Embodiments of the present disclosure introduce systems and techniques to separate paging and access cell selection (and use) among available cells based on different paging cell and access cell service requirements and specific service availability. In an embodiment, a UE may require that paging be on a reliable RAT so that the UE is sure to be reachable but require a high throughput cell and/or RAT for data transfer for a given service. To accomplish this, the UE may select a first cell as a paging cell and a second cell as an access cell to take advantage of differences between the cells.

For example, a UE may first proceed with selecting a paging cell. The UE may do this based on the characteristics of the different cells currently accessible by the UE. Preference may be given to cells with larger coverage areas, so that the UE does not need to re-perform any registration procedure so often (which results in battery drain). The UE may compare measured and reported characteristics of the cells against each other and to any requirements stored by the UE itself. Once the UE selects a cell as paging cell, the UE may then camp on the paging cell while still in IDLE mode to wait for a paging request or a mobile originated request.

In an embodiment, the UE may then consider whether the selected paging cell may also be suitable for access. This may involve comparing the access requirements of a given service with characteristics of the selected paging cell. If the selected paging cell also meets the requirements of the given service, the UE may select the same cell for access as well. Though possible, this may not occur frequently since it may be difficult for one cell to meet the diverging requirements of paging and access. Instead, the UE may compare the requirements of the given service against characteristics measured and/or reported for other cells accessible by the UE (e.g., according to an access cell list). The UE may wait to select an access cell until data transmission is to occur (e.g., where higher latencies are tolerable for a specific service) or while still in IDLE mode (e.g., where latency tolerance is low) and camp on that selected access cell (concurrent to camping on the selected paging cell).

Further, a UE may enable faster establishment of dual connectivity or carrier aggregation schemes with a core network. When responding to a paging request or sending a service request to a core network, a UE may include measurement information for one or more cells around the UE. The core network may use this measurement information to provide bearer and other configuration information to the base station and UE without having to request the UE to perform measurements. This improves the efficiency of the connection(s) between UEs and core networks by reducing the time required to establish dual connectivity or carrier aggregation and amount of signaling overhead.

FIG. 1 illustrates a wireless communication network 100 in accordance with various aspects of the present disclosure. The wireless communication network 100 may include a number of UEs 102, as well as a number of base stations 104. The base stations 104 may include an evolved Node B (eNodeB or eNB) as just one example. A base station 104 may also be referred to as an access node (AN), a base transceiver station, a node B, or an access point, and the like. For purposes of simplicity, reference will be made herein to these as "base stations" as a general term, though it will be recognized that these may be any of the types listed herein (AN, eNB, access point, base station, etc.).

The base stations 104 communicate with the UEs 102 as indicated by communication signals 106. A UE 102 may communicate with the base station 104 via an uplink and a downlink. The downlink (or forward link) refers to the communication link from the base station 104 to the UE 102. The uplink (or reverse link) refers to the communication link from the UE 102 to the base station 104. The base stations 104 may also communicate with one another, directly or indirectly, over wired and/or wireless connections, as indicated by communication signals 108.

UEs 102 may be dispersed throughout the wireless network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, a drone, an entertainment device, a hub, a gateway, an appliance, a wearable, peer-to-peer and device-to-device components/devices (including fixed, stationary, and mobile), Internet of Things (IoT) components/devices, and Internet of Everything (IoE) components/devices, etc. The wireless communication network 100 is one example of a network to which various aspects of the disclosure apply.

Each base station 104 may provide communication coverage for a particular geographic area. In 3GPP, the term "cell" can refer to this particular geographic coverage area of a base station 104 and/or a base station subsystem serving the coverage area, depending on the context in which the term is used. In this regard, a base station 104 may provide communication coverage for a macro cell, a pico cell, a femto cell, and/or other types of cell. A macro cell generally covers a relatively large geographic area (e.g., several kilometers in radius) and may allow unrestricted access by UEs 102 with service subscriptions with the network provider. A pico cell may generally cover a relatively smaller geographic area and may allow unrestricted access by UEs 102 with service subscriptions with the network provider. A femto cell may also generally cover a relatively small geographic area (e.g., a home) and, in addition to unrestricted access, may also provide restricted access by UEs 102 having an association with the femto cell (e.g., UEs 102 in a closed subscriber group (CSG), UEs 102 for users in the home, and the like). A base station for a macro cell may be referred to as a macro base station. A base station for a pico cell may be referred to as a pico base station. A base station for a femto cell may be referred to as a femto base station or a home base station.

In the example shown in FIG. 1, the base stations 104a, 104b and 104c are examples of macro base station for the coverage areas 110a, 110b and 110c, respectively. The base stations 104d and 104e are examples of pico and/or femto base stations for the coverage areas 110d and 110e, respectively. A base station 104 may support one or multiple (e.g., two, three, four, and the like) cells. As can be seen, reference to the coverage areas 110a, 110b, 110c, 110d, and 110e is referring to the cells associated with the base stations 104a, 104b, 104c, 104d, and 104e, respectively. Although each base station 104 in FIG. 1 is illustrated as having a single associated coverage area 110, it will be recognized that each base station 104 can also have multiple coverage areas associated with different frequency carriers and bands, each having different coverage characteristics (such as pathloss, etc.), and that as described herein the selection of a paging cell and an access cell could include the coverage areas of different base stations 104 or different coverage areas for different frequency carriers/frequency bands at a single base station 104.

The wireless network 100 may also include relay stations. A relay station is a station that receives a transmission of data and/or other information from an upstream station (e.g., a base station 104, a UE 102, or the like) and sends a transmission of the data and/or other information to a downstream station (e.g., another UE 102, another base station 104, or the like). A relay station may also be a UE that relays transmissions for other UEs. A relay station may also be referred to as a relay base station, a relay UE, a relay, and the like. Some relays may also have UE capabilities/functionalities.

The wireless network 100 may support synchronous or asynchronous operation. For synchronous operation, the base stations 104 may have similar frame timing, and transmissions from different base stations 104 may be approximately aligned in time. For asynchronous operation, the base stations 104 may have different frame timing, and transmissions from different base stations 104 may not be aligned in time.

In some implementations, the wireless network 100 may utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-1-DM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively. Other frequency, code, and/or time division approaches may also be used.

According to embodiments of the present disclosure, a UE 102 may be within multiple cells at the same time, which the UE 102 may take advantage of in order to use one cell as a paging cell and another cell as an access cell. As used herein, a paging cell refers to a cell, or coverage area 110 for a base station 104, that is used by a UE 102 to receive paging messages and obtain system information from the base station 104 and/or a network, such as a core network. As used herein, an access cell refers to a cell, or coverage area 110 for a base station 104, that is used by a UE 102 for network access to obtain a service such as user data transmission/reception for background or interactive class service. As noted, the coverage areas can be associated with different base stations 104 or different frequency carrier/frequency bands of a single base station 104, or some combination of the above.

FIG. 1 provides an illustrative example. As shown, UE 102a is within the coverage areas 110a, 110b, and 110c of base stations 104a, 104b, and 104c, respectively, at the same time. As also shown, UE 102b is within the coverage areas 110e and 110c of base stations 104e and 104c, respectively, at the same time. Further, UE 102f is within the coverage areas 110d and 110a of base stations 104d and 104a, respectively, at the same time. Discussion will focus on a specific UE 102 for simplicity of discussion. Looking at UE 102b as a specific example, the UE 102b may be in IDLE mode while within coverage of both base stations 104e and 104c. As illustrated, the macro coverage area 110c of base station 104c is large relative to the coverage area 110e of the base station 104e (which may be, for example, a pico or femto base station).

The coverage area 110c may be suitable for the UE 102b to select as a paging cell, since paging typically is best served by a large coverage area. For example, the macro cell of the coverage area 110c may be deployed on a sub-6 GHz carrier to provide a larger coverage area. Otherwise, if the coverage area of a base station 104 used for paging is small, the UE 102b would have to perform a registration procedure much more often, which can end up in significant (and potentially unnecessary) battery drain on the UE 102b. But a cell that is well-suited for paging may not be well-suited for access.

For example, the UE 102b may require or desire an access cell that provides much more radio resource than a macro cell may be able to provide (e.g., to achieve a high data rate in transmission/reception of data for some service). Such high data rates sometimes are best achieved in smaller cells, such as femto or pico cells. For example, the cell of the coverage area 110e may be deployed with mmW frequency bands to offer significant bandwidth for data transfer. In an embodiment, the base station 104c and the base station 104e may be deployed in a same radio access technology ("RAT") (e.g., LTE or 5G) while in an alternative embodiment, the base station 104c may be deployed with a first RAT (such as LTE) while the base station 104e may be deployed with a second RAT (such as 5G).

At times, a single cell may not be able to simultaneously meet the diverging requirements of the UE 102b for both paging and access. According to embodiments of the present disclosure, the UE 102b may first focus on selecting a paging cell while in IDLE mode. The UE 102b may select a paging cell based on the system information provided from each base station 104 in which the UE 102b receives coverage, which in FIG. 1 are base stations 104c and 104e. Specifically, the UE 102b may determine which of the base stations 104c and 104e provide a suitable coverage area that, for example, is large enough that the UE 102b does not need to perform registration procedures as often so as to conserve battery power. This information may be stored and/or determined at the UE 102b as part of a paging service requirement (which may also include, for example, reliability requirements/preferences, latency requirements/preferences, and power requirements/preferences to name a few examples). In this example, the UE 102b selects the base station 104c whose corresponding coverage area 110c better meets the desired characteristics as a paging cell (i.e., meets the paging service requirement), and camps on the base station 104c while still in IDLE mode, waiting for a paging message from a core network.

In an embodiment, the UE 102b then turns to selecting a base station 104 as its access cell. In an embodiment, the UE 102b may wait to select an access cell until data transmission is to occur (e.g., where higher latencies are tolerable for a specific service) while in another embodiment (e.g., where latency tolerance is low) the UE 102b may select an access cell while still in IDLE mode and camp on that selected access cell (concurrent to camping on the selected paging cell). To select an access cell, the UE 102b obtains system information from each of the base stations 104c, 104e whose coverage areas 110c, 110e the UE 102b is within. The UE 102b compares one or more aspects of the system information, such as the RAT, data rate, bandwidth, frequency(ies), signal strength (e.g., RSS), and/or other information relevant to the selected service for which the UE 102b requires access, to the requirements of the selected service, sometimes referred to as access service requirements (which may include, for example, throughput requirements/preferences, latency requirements/preferences, reliability requirements/preferences, quality of service requirements/preferences, and cost requirements/preferences to name a few examples). The UE 102b then selects a base station 104 to serve as the access cell for the UE 102b. In an embodiment, the selection of the paging and access cells may occur while the service (one or more of them) at the UE 102*b* is inactive (e.g., not currently in use). The selection, by default, is for paging and access cells that meet the one or more service requirements and/or preferences once the service becomes active. In another embodiment, the selection may occur while the service is active, for example where the service is available to receive or transmit data, though traffic may not be currently coming or going for the service at the UE 102*b*.

Cell selection can be done in a variety of manners. For example, in an embodiment, the UE 102*b* may select the same cell as both the paging cell and the access cell, though often this may not be the case. In an alternative embodiment, the UE 102*b* may select different cells for each—in FIG. 1, for example, the UE 102*b* may select the base station 104*e* whose coverage area is small and which may provide a better throughput for the type of service which UE 102*b* seeks to obtain. When the UE 102*b* becomes mobile, as can be seen from FIG. 1 the UE 102*b* may leave the coverage area of a selected access cell while still remaining in the coverage area of the selected paging cell. Thus, the UE 102*b* may reselect an access cell while retaining the same paging cell (as will be recognized, the converse may also occur: a paging cell may be reselected while the access cell is not).

Figure 2:
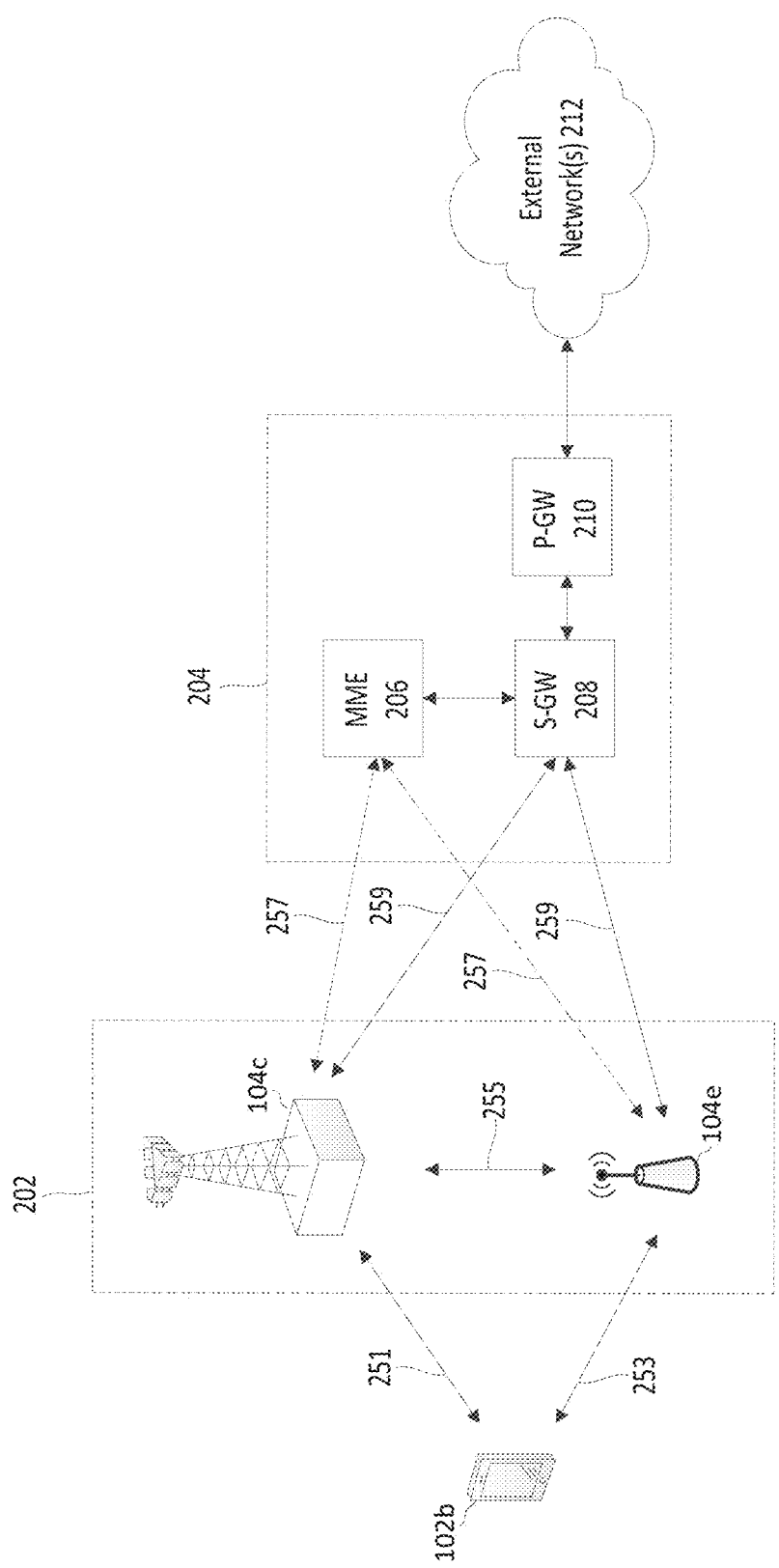
FIG. 2 illustrates a wireless communication network in accordance with various aspects of the present disclosure.

Turning now to FIG. 2, a wireless communication network 200 is illustrated in accordance with various aspects of the present disclosure. The wireless communication network 200 may include one or more UEs 102 in communication with an access network 202, a core network 204, and an external network 212.

The access network 202 may be or include, for example, the wireless communication network 100 as discussed above with respect to FIG. 1. For example, the access network 202 may include base stations 104. Continuing with the example discussed above with respect to FIG. 1, the UE 102 may be UE 102*b* in communication with base station 104*c* and base station 104*e* via connections 251 and 253. For example, the UE 102*b* may select base station 104*c* to serve as the paging cell, and therefore connection 251 to the UE 102*b* may convey paging messages from the core network 204. The UE 102*b* may select the base station 104*e* to serve as the access cell, and therefore connection 253 to the UE 102*b* may provide the uplink and/or downlink data between the UE 102*b* and the core network 204. The base stations 104 may also communicate with each other via interface 255. The interface 255 may be an interconnection such as an X2 interface, for example, that may be used to aid in efficient handovers between base stations 104 as the UE 102*b* is in transit.

The base stations 104 may be in communication with different elements of the core network 204 via connections 257 and 259. The connections 257 may be S1-MME interfaces and the connections 259 may be S1-U interfaces, to name some examples. The core network 204 may include a mobility management entity (MME) 206, a serving gateway (S-GW) 208, and a packet data network gateway (P-GW) 210. As will be recognized, the core network 204 includes other network elements that are not shown in FIG. 2 for simplicity of discussion of aspects of the present disclosure.

The MME 206 is a control node that handles signaling between the UE 102 via the base stations 104 and the rest of the core network 204. The MME 206 may be in charge of control plane functions related to subscribers (e.g., UE 102) and session management. For example, the MME 206 may provide mobility session management as well as support for handovers to other networks, roaming, and subscriber authentication. The MME 206 may assist in selection of a S-GW 208 during an initial attach of the UE 102, non-access stratum (NAS) signaling, NAS signaling security, P-GW 210 selection, bearer management functions including dedicated bearer establishment, lawful interception of signaling traffic, and other functions to name just a few examples.

According to embodiments of the present disclosure, a paging request may originate from the core network 204. For example, the MME 206 may distribute a paging request to the UE 102*b* via the paging cell operated by base station 104*c* when a connection needs to be established with the UE 102*b* (e.g., a mobile terminated connection). This may occur when the UE 102*b* is in IDLE mode. The MME 206 may distribute the paging request to multiple base stations 104 based on one or more tracking areas where the UE 102*b* is expected to be located, including the base station 104*c*, for example via connection(s) 257. As a result, the core network 204 may page the UE 102*b* via the base station 104*c* in response to the UE 102*b* having selected the base station 104*c* on which to camp as its paging cell. In an embodiment, the MME 206 may receive a paging response from the UE 102*b* via the base station 104*c* (the paging cell).

The S-GW 208 is a gateway that provides an interface between the access network 202 and the core network 204 for data (such as IP packets). The S-GW 208 assists in inter-base station handover, provides mobility anchoring for mobility between different standards (e.g., 2G, 3G, 4G, LTE, 5G and future networks, etc.), lawful interception, packet-based routing and forwarding, and accounting for inter-operator charging to name just a few examples. The S-GW 208 may retain information about one or more bearers when the UE 102*b* is in an IDLE mode as well as buffer downlink data while the MME 206 initiates paging of the UE 102*b* (e.g., via the paging cell on which the UE 102*b* has decided to camp) to reestablish the bearers. The S-GW 208 may also be in communication with the MME 206 in the core network 204 or, in an embodiment, be physically co-located or combined with the MME 206 in a single system.

According to embodiments of the present disclosure, the S-GW 208 may receive data from the UE 102*b* via the base station 104*e* that has been selected as the access cell (e.g., via the connection 259) as well as transmit data to the UE 102*b* via the access cell of base station 104*e*. In an embodiment, the S-GW 208 may receive a service request from the UE 102*b* via the base station 104*e* where there was no page, but instead the UE 102*b* initiates connection on its own initiative. The communication may be in furtherance of a specific service. Further downlink and uplink data may be received at, and transmitted from, the S-GW 208 via the access cell's base station 104*e*.

Thus, according to embodiments of the present disclosure, a first node such as MME 206 may send paging requests to the UE 102 and receive paging responses via a paging cell that the UE is camped on. A second node such as S-GW 208 may cooperate with the access cell to establish a data connection with the UE 102. In additional or alternative embodiments of the present disclosure, a first node that sends paging requests originating from the core network 204 may be a first base station 104 providing the paging cell. A second base station 104 may establish a data connection providing the access cell. These base stations 104 may be co-located (e.g., on a same physical tower), located at different physical towers, be same virtual base stations, etc. Further, the nodes may, in an embodiment, be cellular, while in other embodiments the nodes may be in different operator networks without departing from the scope of the present disclosure.

The S-GW 208 routes and forwards data packets from the UE 102*b* (via the access cell) to the P-GW 210 (and vice-versa). FIG. 2 illustrates a single P-GW 210 for sake of simplicity, though it will be recognized that there may be multiple external networks to which data may be directed or received, where external network 212 is just one example. The P-GW 210 provides connectivity between the core network 204 and external packet data networks 212 as the point of exit and entry for data traffic from/to the UE 102b. Some examples of external networks include one or more IP networks (and, in some embodiments, circuit-switched networks). The P-GW 210 may be involved in per-user based packet filtering, lawful interception, service level gating control, service level rate enforcement, and packet screening to name just a few examples.

Figure 3:
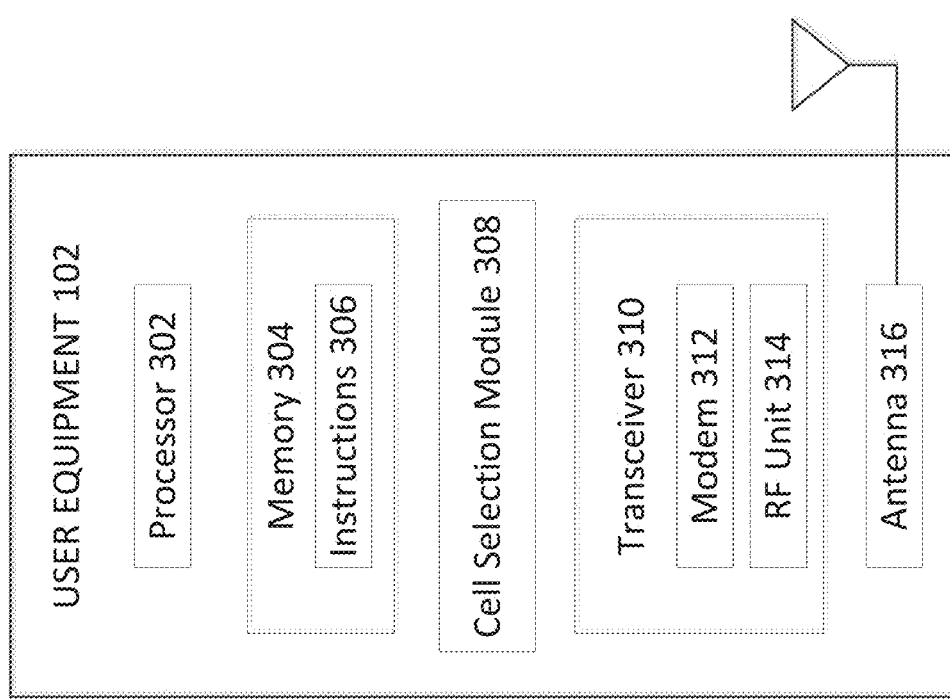
FIG. 3 is a block diagram of an exemplary wireless communication device according to embodiments of the present disclosure.

FIG. 3 is a block diagram of an exemplary wireless communication device 300 according to embodiments of the present disclosure. The wireless communication device 300 may be a UE having any one of many configurations described above. For purposes of example, wireless communication device 300 may be a UE 102 as discussed above with respect to FIGS. 1 and 2.

As shown, the UE 102 may include a processor 302, a memory 304, a cell selection module 208, a transceiver 310 (including a modem 312 and RF unit 314), and an antenna 316. These elements may be in direct or indirect communication with each other, for example via one or more buses.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to UEs 102. In particular, the processor 302 may be utilized in combination with the other components of the UE 102, including cell selection module 308, to perform the various functions associated with embodiments of the present disclosure. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 102 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The cell selection module 308 may be used for various aspects of the present disclosure. For example, the cell selection module 308 may be involved in the selection of (and reselection where applicable) paging and access cells, and in directing the UE 102 to camp on the selected paging and access cells. For example, with respect to selecting (or reselecting) a paging cell, the cell selection module 308 may analyze a range of information regarding the candidate cells (e.g., the base stations 104 in whose coverage areas the UE 102 currently resides). For example, the UE 102 may measure one or more radio conditions of the different coverage areas, including for example reference signal received power (RSRP), reference signal received quality (RSRQ), signal to noise ratio, and/or signal to interference ratio to name just a few examples. The UE 102 may also analyze system information about the availability of paging services received from the different base stations 104 (as provided by the transceiver 310 and via the processor 302) of either or both of candidate cells or the current paging cell (where the UE 102 is already camped on a determined paging cell, such as in reselection, as part of a neighbor cell list). In an alternative embodiment, this may be signaled from the core network 204 via the base stations 104 in a unicast message.

After analyzing the range of information available, the cell selection module 308 then selects a base station 104 as the paging cell. For example, according to the example in FIG. 1, UE 102b selects base station 104c as its paging cell based on a combination of factors, which may include system information provided from the base station 104c, measured information, and in embodiments also public land mobile network (PLMN) information together with some or all of the above. This may include the size of the coverage area (estimated or reported by the base station 104c) as compared to the size of the coverage areas of any other base stations 104 detected by the UE 102, a reliability measure of the different base stations 104 (e.g., as indicated by the measurements such as SNR) compared to each other, or some other comparison between the different available base stations 104. This is all compared against one or more paging service requirements and/or preferences (e.g., reliability, latency, power, and/or coverage requirements/preferences) that may be stored at the UE 102, for example from one or more services at the UE 102 (whether active or inactive). Once the cell selection module 308 has analyzed and selected a base station 104 to serve as the paging cell (e.g., a cell that meets the paging service requirements and/or preferences for the one or more services), the cell selection module 308 directs the UE 102 to camp on the selected base station 104 while the UE 102 is still in IDLE mode. As a result, the UE 102 may subsequently receive a paging request from the core network 204 via the paging cell (the selected base station 104). When the UE 102 moves (in response to mobility of the UE 102), the cell selection module 308 may at times re-evaluate and reselect a paging cell as conditions change.

The cell selection module 308 also analyzes and selects an access cell for the UE 102. This may occur after a paging cell has been identified, selected, and camped on so that the UE 102 is able to receiving paging requests thereafter. In an embodiment, the UE 102 engages in access cell selection in response to an indication from the paging cell (or paging cell candidates) that the network in question supports paging cell camping and access cell separation. Access cell selection by the cell selection module 308 may be triggered by any one of the UE 102 camping on a new paging cell, a change in some related information for the currently selected access cell, and the currently selected access cell becoming unavailable (e.g., the UE 102 leaving a coverage area of the access cell's base station 104 or the base station 104 becoming congested).

Separate from, or together with, the rest of the access cell selection process, the cell selection module 308 may analyze the selected paging cell to determine whether the paging cell is also suitable for use as an access cell for the UE 102. This analysis may be accomplished by comparing the measured and/or reported characteristics of the selected paging cell with one or more determined or listed requirements and/or preferences (e.g., access service requirements including, for example, throughput, latency, reliability, and/or cost requirements/preferences) of a service for which the UE 102 may use an access cell in which to complete the service (that involves the uplink and/or downlink transmission of data between the UE 102 and the core network 204). Some examples of services include conversational, streaming, interactive, background class, and industrial automation services. These are exemplary only and should not be considered a comprehensive list of possible services which the UE 102 may seek to obtain in response to a service request, such as by a user.

In an embodiment, the UE 102 may store a list of services that are available to the UE 102 (e.g., pre-programmed in the UE 102, indicated by a user of UE 102, or a list of programs that may require services installed in the UE 102 to name some examples). The characteristics of the paging cell (and of any candidate cells as discussed below) may be included in one or more of system information, neighbor cell lists, and access cell lists sent from a base station 104. Where there are multiple services available to the UE 102 (e.g., the UE 102 may be required to access/use any of them at a given time), the cell selection module 308 rank the available services according to some metric (e.g., frequency of use, stored ranking, most recently used, etc.) against each other and perform the analysis against the characteristics of the available cells. Alternatively, the cell selection module 308 may compare the characteristics of the available cells against all of the available services and select the cell for access that results in the best overall result (e.g., highest numerical comparison result). Where there are multiple services available, and the UE 102 selects an access cell based on an anticipated service, but another service is then requested or otherwise needs to activate, the cell selection module 308 may reconsider the selected access cell in case there is another candidate cell more suitable for the particular needs of the requested service. In an embodiment, a service has already become active at the UE 102 and therefore the cell selection module 308 compares the characteristics of the available cells against the requirements/preferences of the active service.

Returning specifically to the consideration of the paging cell, if the cell selection module 308 determines that the paging cell is also suitable for the services requested (e.g., an active service or expected to be requested from inactive service(s)), the cell selection module 308 may select the paging cell as the access cell as well, in which case the cell may be simply referred to as the selected service cell. Often, however, it is possible that the cell selection module 308 will determine after analysis that the paging cell is not suitable as an access cell for the anticipated service(s). As a result, the cell selection module 308 further analyzes one or more characteristics of the other base stations 104 in whose coverage area the UE 102 currently resides. As will be recognized, this may be the same list of base stations 104 as was considered for paging cell selection or may be different due to the change of some condition (such as the position of the UE 102 before access cell selection begins). The UE 102 may again measure one or more radio conditions of the different coverage areas of the candidate cells, including for example RSRP, RSRQ, signal to noise ratio, and/or signal to interference ratio to name just a few examples.

For example, the UE 102 may search an access cell list provided by the network, e.g. by the S-GW 208 and/or the MME 206 of the core network 204 in FIG. 2, as part of system information or a unicast message. The access cell list may include, with the list of access cells, one or more of the following parameters for each access cell: frequency information (e.g., UARFCN), cell identity/zone identity, services available at the access cell, and congestion status/access control information. With respect to the congestion status/access control information, because this information can be quite dynamic in terms of frequency of update, in some embodiments it may not be included in the system information of the paging cell but instead acquired by the UE 102 from an access cell directly when the UE 102 attempts to access the access cell.

The cell selection module 308 analyzes information regarding the candidate cells (e.g. the base stations 104 in whose coverage areas 110 the UE 102 currently resides) pertinent to one or more services associated with the type of connection to be established upon request or need. For example, the cell selection module 308 may compare characteristics of the service it needs to utilize (or anticipates needing) against one or more parameters of the available cells, such as those listed above including one or more measurements of the candidates, for any of the available services as discussed above. The cell selection module 308 may determine which access cell has the highest fit with the requirements and/or characteristics of the required service and make its selection based on this fit. For example, the cell selection module 308 may assign a numerical weight to each parameter used in a comparison between available cells and the characteristics of the required service, and select the cell with the highest total score. Alternatively, where a given parameter is deemed most important, the result of the comparison for that parameter may take precedence over any other parameters, even where a different cell would otherwise be selected.

In an embodiment, the information analyzed by the cell selection module 308 also includes access control information provided by the core network 204. For example, the access control information may include barring information. Barring information assigns a barring rate for each potential access cell in the access cell list (or, alternatively, for each frequency or frequency band). The cell selection module 308 may take this access control information, for example the barring rate, and compare the barring rate to a random number that the cell selection module 308 draws for the UE 102*b* when initiating an access attempt to the core network 204 via a base station 104. The barring rate may be, for example, one of a fixed number of mobile populations, such as access classes 0 to 9, to which each UE 102 is randomly allocated. UEs 102 may also be assigned to one or more special categories which enjoy a higher priority than the fixed number of mobile populations.

Where access control information is included, the comparison may be between the barring rate for the UE 102 and a random number uniformly distributed in the range of greater than or equal to zero and less than one. If the random number is less than the barring rate, then access to the given cell is not barred. Otherwise, access to the cell is barred—the UE 102 will have to select a different cell for access (until, for example, a timer that starts when barred expires). If access is not barred based on the barring rate, then the cell selection module 308 may still base the determination on one or more of the other parameters discussed above.

After analyzing the parameters (including measurement comparisons and access control information, where included), the cell selection module 308 then selects a base station 104 as the access cell. For example, according to the example in FIG. 1, UE 102*b* selects base station 104*e* as its access cell based on a combination of factors, which may include the parameters provided with an access cell list compared against the characteristics of the required service (whether active or inactive at the time). Once the cell selection module 308 has analyzed and selected a base station 104 to serve as the access cell, the cell selection module 308 directs the UE 102 to camp on the selected base station 104 while the UE 102 is still in IDLE mode. As noted previously, this may occur before any data must be sent or requested (e.g., where low latency is required), or at the time when data is required or must be sent (e.g., where high latency is tolerable).

The cell selection module 308 may either engage in access cell selection just after paging cell selection, or may wait to perform access cell selection until actual data transmission becomes necessary (for example, a paging request is received or data arises that needs to be sent from the UE 102 to some other entity via the core network 204). The time at which to make the selection may depend upon the requirements of a given service; for example, a service that requires a low level of latency may cause the cell selection module 308 to perform access cell selection now instead of later, so that the UE 102 is camped on a selected access cell prior to any need for data transmission actually arises. As another example, a service for the UE 102 that has a high latency tolerance, the cell selection module 308 may wait in selecting an access cell until a need for data transmission actually occurs, such as with the arrival of a page from the base station 104 selected as the paging cell.

Embodiments of the present disclosure may also be utilized to speed up the configuration of dual connectivity or carrier aggregation for a connection between the UE 102 and the base station 104. This can be useful because a significant contributing factor to the delay in configuring dual connectivity or carrier aggregation is often the delay imposed in obtaining measured results of the small cells in which dual connectivity or carrier aggregation may occur.

The UE 102 may perform paging cell selection/reselection as generally described above. Once the UE 102 is camped on a selected paging cell, the UE 102 may check whether any access cell information is available in the system information of the paging cell on which the UE 102 is camped. In some embodiments, measurement configuration parameters may also be present as part of the access cell information. The UE 102 may perform measurements of the access cell candidates (e.g., the access cells provided in a list). The measurements may include those described above, for example specifically RSRP and/or RSRQ. The results of these measurements may be reported to the core network 204 when a connection (e.g., a radio resource control (RRC) connection) is established with the selected access cell (e.g., base station 104*e*). The measurement results may be sent via a MeasurementReport message after a connection with an access cell is established. In an alternative embodiment, the measurement results may be piggy-backed with another message such as a completion message (e.g., RRCConnectionSetupComplete) via the selected paging cell.

By taking the measurements of access cell candidates before a connection is established, and reporting those measurements at the time that the connection is established (or after), a dual connectivity or carrier aggregation configuration may be established faster than is conventionally achieved since the measurement no longer occurs after the connection is established.

As shown, the transceiver 310 may include the modem subsystem 312 and the radio frequency (RF) unit 314. The transceiver 310 can be configured to communicate bi-directionally with other devices, such as base stations 104. The modem subsystem 312 may be configured to modulate and/or encode the data from the cell selection module 308 and other aspects of the UE 102, such as processor 302 and/or memory 304, according to a modulation and coding scheme (MCS), e.g., a low-density parity check (LDPC) coding scheme, a turbo coding scheme, a convolutional coding scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a base station 104. Although shown as integrated together in transceiver 310, the modem subsystem 312 and the RF unit 314 may be separate devices that are coupled together at the UE 102 to enable the UE 102 to communicate with other devices.

The RF unit 314 may provide the modulated and/or processed data, e.g. data packets (or, more generally, data messages that may contain one or more data packets and other information), to the antenna 316 for transmission to one or more other devices. This may include, for example, transmission of information to complete attachment to a network, to camp on a paging network, and camp on an access network according to embodiments of the present disclosure. The antenna 316 may further receive data messages transmitted from other devices and provide the received data messages for processing and/or demodulation at the transceiver 310. Although FIG. 3 illustrates antenna 316 as a single antenna, antenna 316 may include multiple antennas of similar or different designs in order to sustain multiple transmission links.

Figure 4:
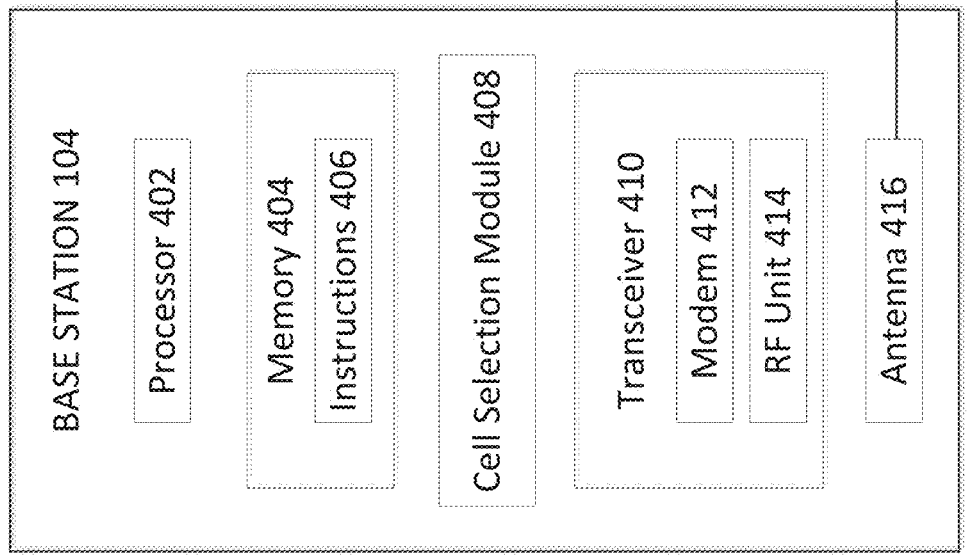
FIG. 4 is a block diagram of an exemplary base station device according to embodiments of the present disclosure.

FIG. 4 is a block diagram of an exemplary wireless communication device 400 according to embodiments of the present disclosure. The wireless communication device 400 may be a base station having any one of many configurations described above. For purposes of example, wireless communication device 400 may be a base station 104 as discussed above with respect to FIGS. 1 and 2. The base station 104 may include a processor 402, a memory 404, a cell selection module 408, a transceiver 410 (including a modem 412 and RF unit 414), and an antenna 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein with reference to the base stations 104 introduced in FIG. 1 above. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 302), RAM, MRAM, ROM, PROM, EPROM, EEPROM, flash memory, a solid state memory device, one or more hard disk drives, memristorbased arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein with reference to a base station 104 in connection with embodiments of the present disclosure. Instructions 406 may also be referred to as code, which may be interpreted broadly to include any type of computer-readable statement(s) as discussed above with respect to FIG. 3.

The cell selection module 408 may be used for various aspects of the present disclosure. For example, the cell selection module 408 may be involved in communicating with a UE 102 to provide information the UE 102 then uses to select a paging cell and an access cell. The cell selection module 408 may access system information about the base station 104 (and its corresponding coverage area 110) and instruct the transceiver 410 of the base station 104 to transmit the accessed system information. The UE 102 may then use this system information as described above to determine whether to select the base station 104 as a paging cell. In an alternative embodiment, the cell selection module 408 may cause the base station 104 to forward the system information from the core network 204 via the base station 104, for example in a unicast message.

In assisting with access cell selection, the cell selection module 408 may provide an indication to the UE 102 that the network in question supports paging cell camping and access cell separation. This may be stored in the memory 404 or, alternatively, the cell selection module 408 may cause the base station 104 to forward this information from the core network 204. The cell selection module 408 may further cause the base station 104 to forward an access cell list provided by the network, e.g. by the S-GW 208 and/or the MME 206 of the core network 204 in FIG. 2, as part of system information or a unicast message. This access cell list may include congestion status and/or access control information, for example as discussed above with respect to FIG. 3.

As shown, the transceiver 410 may include the modem subsystem 412 and the radio frequency (RF) unit 414. The transceiver 410 can be configured to communicate bi-directionally with other devices, such as UE 102 and/or another core network element. The modem subsystem 412 may be configured to modulate and/or encode data according to a MCS, e.g., a LDPC coding scheme, a turbo coding scheme, a convolutional coding scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 102. Although shown as integrated together in transceiver 410, the modem subsystem 412 and the RF unit 414 may be separate devices that are coupled together at the base station 104 to enable the base station 104 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of information to complete attachment to a network and communication with a camped UE 102 according to embodiments of the present disclosure. The antenna 416 may further receive data messages transmitted from other devices and provide the received data messages for processing and/or demodulation at the transceiver 410. Although FIG. 4 illustrates antenna 416 as a single antenna, antenna 416 may include multiple antennas of similar or different designs in order to sustain multiple transmission links.

Figure 5:
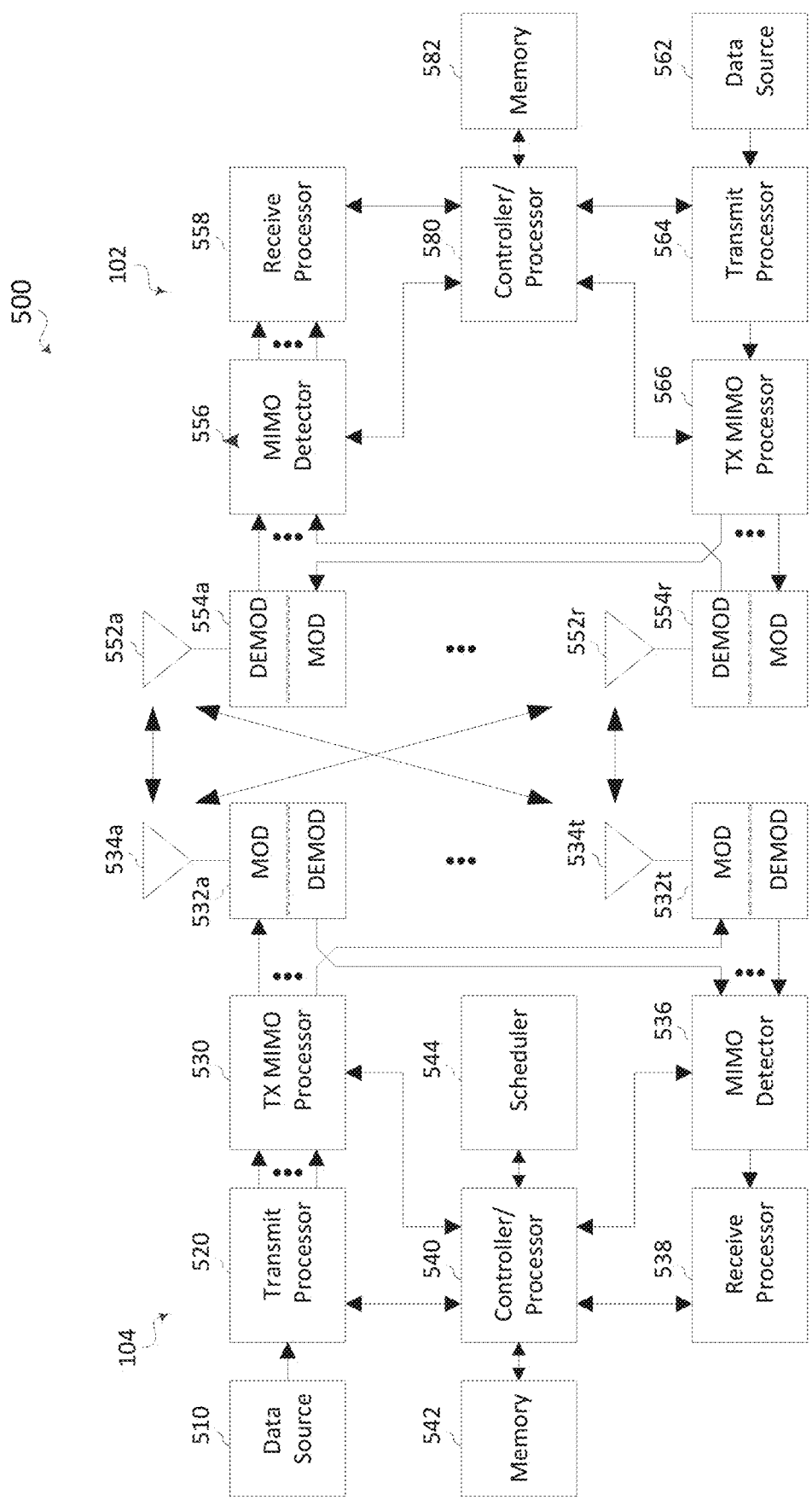
FIG. 5 is a block diagram illustrating an exemplary transmitter and receiver system in accordance with various aspects of the present disclosure.

FIG. 5 shows a block diagram illustrating communication between two wireless communication devices of a MIMO system 500 in accordance with the present disclosure. For sake of clarity in explanation, a base station 104 and a UE 102 are shown. However, it is understood that the following description is applicable to communication between any two wireless communication devices in accordance with the present disclosure. Further, the following discussion will focus on those aspects pertinent to the present disclosure; as will be recognized, the elements of FIG. 5 may be further used for other purposes.

At the base station 104, a transmit processor 520 may receive data from a data source 510 and control information from a controller/processor 540. The data rate, coding, and modulation for each data stream may be determined by instructions performed by processor 530. The data may be data from a S-GW 208 and the control information may be a paging request from MME 206, to name some examples. The transmit processor 520 may process (e.g., encode and symbol map) the data and control information to obtain data symbols and control symbols, respectively. This may include, for example, symbol mapping based on a particular modulation scheme (e.g., BPSK, QSPK, M-PSK, or M-QAM). A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t.

Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via antennas 534a through 534t, respectively. Embodiments of the present disclosure include having only one antenna or having multiple antennas (at one or both of base station 104 and UE 102).

At the UE 102, antennas 552a through 552r may receive the downlink signals from the base station 104 and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 102, and provide decoded control information to a controller/processor 580.

On the uplink, at the UE 102, a transmit processor 564 may receive and process data from a data source 562 and control information from the controller/processor 580. The data may include data transmitted as part of a service (e.g., to a base station 104 that is an access cell) and the control information may include attach information and/or connection setup or paging response information (e.g., to a base station that is a paging cell). The transmit processor 564 may also generate reference symbols for a reference signal.

The symbols from the transmit processor 564 may be precoded by a TX MIMO processor 566 if applicable, further processed by the modulators 554a through 554r (e.g., for SC-FDM, etc.), and transmitted to the base station 104. At the base station 104, the uplink signals from the UE 102 may be received by the antennas 534, processed by the demodulators 532, detected by a MIMO detector 536, if applicable, and further processed by a receive processor 538 to obtain decoded data and control information sent by the UE 102. The processor 538 may provide the decoded data to a data sink and the decoded control information to the controller/processor 540.

The controllers/processors 540 and 580 may direct the operation at the base station 104 and the UE 102, respectively. The controller/processor 540 and/or other processors and modules at the base station 104 may perform or direct the execution of various processes for the techniques described herein, including paging and/or access cell operations as described with respect to other figures in the present disclosure. The controllers/processor 580 and/or other processors and modules at the UE 102 may also perform or direct the execution of the various processes for the techniques described herein, including identifying cells on which to camp (paging and access), selecting those cells, camping on those cells, and entering connected mode as described in this disclosure.

In this regard, the memories 542 and 582 may store data and program codes for the base station 104 and the UE 102, respectively, to perform or direct the execution of these various processes (for example as described above with respect to FIGS. 3 and 4). A scheduler 544 may schedule wireless communication devices for data transmission on the downlink and/or uplink.

Figure 6:
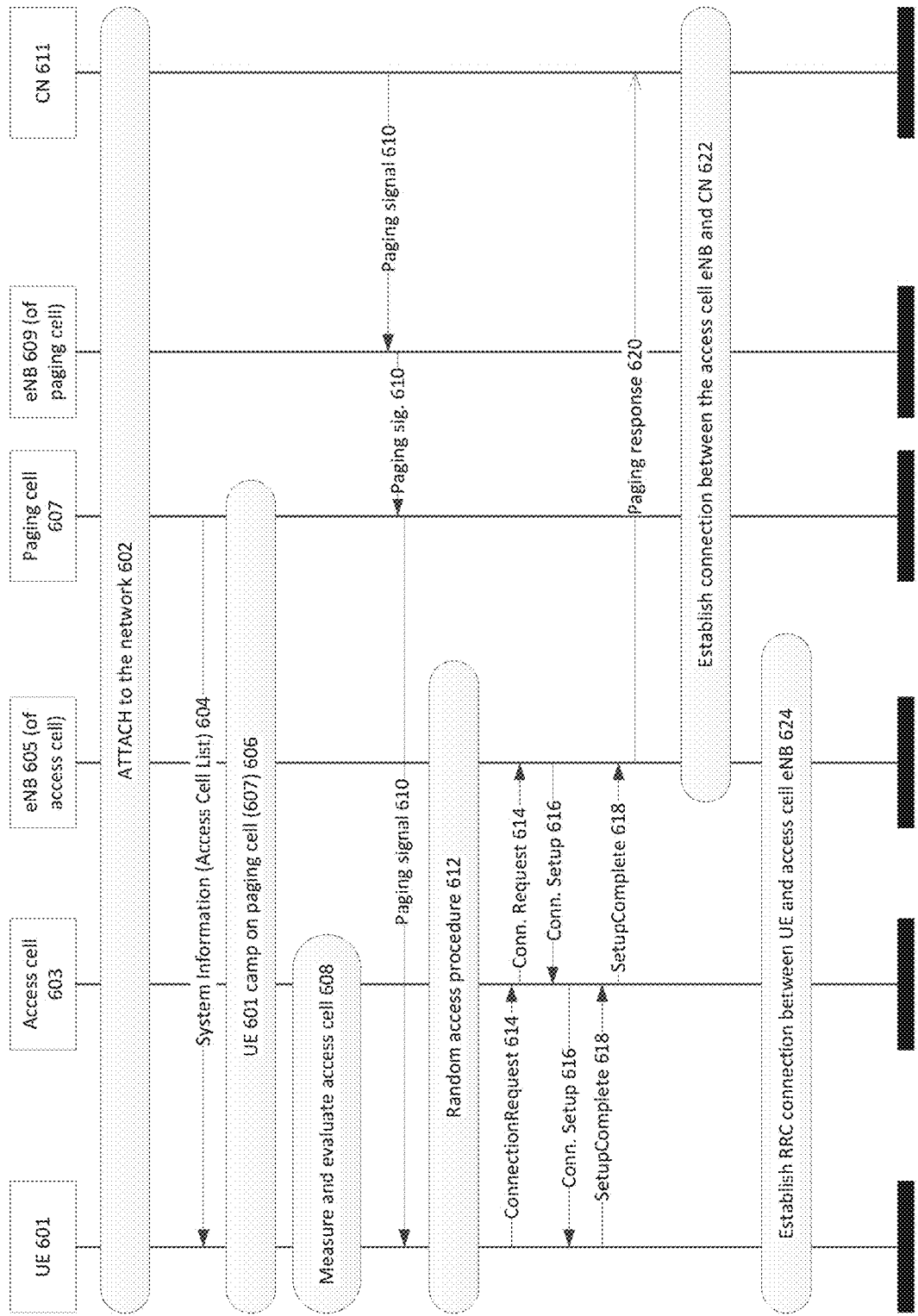
FIG. 6 is a protocol diagram illustrating exemplary signaling aspects between a UE, paging cell, access cell, and core network in accordance with various aspects of the present disclosure.

Referring now to FIG. 6, shown is a protocol diagram illustrating exemplary signaling aspects between a UE 601, a paging cell 607 (and eNB 609 of paging cell 607), an access cell 603 (and eNB 605 of access cell 603), and core network 611 in accordance with various aspects of the present disclosure. The UE 601 may be, for example, an instance of UE 102, and the eNBs 605 and 609 may be instances of base stations 104 (such as base stations 104e and 104c, respectively). In particular, FIG. 6 illustrates an embodiment in which call setup occurs in a mobile termination scenario (e.g., the call is instigated by a page from the core network 611, instead of originating by the UE 601).

At action 602, the UE 601 attaches to the core network 611. This may include, as will be recognized, transmission of an attach request from the UE 601 to the core network 611 via one of the UEs 605/609, generation of an authentication vector by the core network 611, an authentication response by the core network 611 to the eNB 605/609 through which the UE 601 is attempting to attach, and mutual authentication between the UE 601 and the eNB 605/609. After attaching to the core network 611, the UE 601 may enter IDLE mode when there is no data to transmit or receive.

At action 604, the paging cell 607 sends system information to the UE 601 if the UE 601 has not yet acquired the system information from the paging cell 607. Alternatively, if the UE 601 has previously acquired/received the system information, the UE 601 may retrieve the system information of the paging cell 607 from internal memory (e.g., if the UE 601 stored it previously and/or the system information is still valid for the paging cell 607). This system information may be of a candidate cell to which the UE 601 is considering camping on, or of a cell on which the UE 601 is already camped on (in which case it may include a neighbor cell list). In an embodiment, the system information includes an access cell list which the UE 601 may subsequently also use in selecting an access cell. The UE 601 checks the radio conditions of the paging cell 607 to determine if it is suitable to serve as a paging cell. The UE 601 also checks the paging service availability of the paging cell 607 (as provided by the system information) to confirm that the cell supports paging service.

At action 606, the UE 601 selects the cell that supports paging service and which meets any other selection criteria, such as discussed above with respect to FIG. 3, and camps on the selected paging cell 607 (while the UE 601 is still in IDLE mode).

At action 608, as the UE 601 is in IDLE mode and camped on the paging cell 607, the UE 601 may measure and evaluate the candidate access cells. For example, the UE 601 may decide which cells to measure and evaluate based on the access cell list received (or accessed) at action 604 (as part of the system information from the paging cell 607). The measurement and evaluation may include the paging cell 607 as well as any other cells in whose coverage areas the UE 601 currently resides. The access cell list may include a list of access cells and different parameters of each cell, for example frequency information, cell identity/zone identity, services available at the cell, and congestion status (and/or access control information). In an embodiment, the UE 601 may obtain relatively static aspects of the information from a neighbor list of the system information from the paging cell 607 (e.g., frequency information, cell identity, zone identity, and service availability information that indicates support statuses of the services for each neighbor cell/zone). Further, the UE 601 may filter this list to filter out irrelevant cells from the candidate list. After this filtering, the UE 601 may then obtain relatively dynamic information (such as serving availability information indicating whether the service is actually available at the particular access cell candidate, as well as congestion status and access control information) from the system information of the access cell 603 (e.g., as the UE 601 evaluates the access cell selection criteria). The UE 601 compares the measurement results and/or the information obtained in the system information (whether from just the paging cell 607 or also one or more access cells) against the services required to determine a best fit for the service, and then selects access cell 603 in response to the comparison, for example while still in IDLE mode.

At action 610, the core network 611 sends a paging signal, also referred to as a paging message, to the eNB 609 of the paging cell 607 on which the UE 601 is currently camped on in IDLE mode (for example, via an S1-MME connection from an MME in the core network 611). The eNB 609, in turn, transmits the paging signal on to the UE 601. In an embodiment, the paging message includes service information about the type of call that is sought to be established.

At action 612, the UE 601 transitions to connected mode in response to the paging signal and initiates a random access procedure with the eNB 605 of the selected access cell 603. This may include, for example, the UE 601 initiating a session with the eNB 605 using a random access preamble. The eNB 605 generates a random access response that can include assignment of a cell radio network temporary identifier (C-RNTI) that will be used to address the UE 601, a timing advance that may adjust the UE 601 transmitter timing (e.g., to synchronize the UE transmitter to the eNB's timing window), and also may include uplink resource assignment.

At action 614, the UE 601 may send a connection request to the eNB 605 of the selected access cell 603. For example, the UE 601 sends a RRC connection request to the eNB 605 after the random access procedure completes. The UE 601 identifies itself in the RRC connection request with either the UE identity (such as S-Temporary Mobile Subscriber Identity (S-TMSI), which is a shortened form of Global Unique Temporary Identity (GUTI)) or a random number selected by the UE 601. The RRC connection request may also identify the establishment cause, for example here mobile terminated signaling.

At action 616, the eNB 605 responds to the RRC connection request with a connection setup message that it transmits to the UE 601, such as a RRC connection setup message, and the UE 601 identifies the RRCE connection setup message from the eNB 605 with the UE identity (or random number) that had been included in the connection request message at action 614. The RRC connection setup message may include an identification of the signaling radio bearer as well as various configuration parameters. For example, this may include radio link control (RLC) uplink configuration (such as a timer for status report polling, a number of retransmissions of buffer status report, a control plane retransmission limit to name a few examples), RLC downlink configuration (such as a maximum wait time for packet reordering), and uplink shared channel (UL-SCH) configuration (such as a maximum number of hybrid automatic repeat request (ARQ) transmissions and periodic/ regular buffer status report timer). The RRC connection setup message may also include power headroom report (PHR) configuration (including a periodicity of the PHR, for example), and uplink power control parameters (including values used to determine a nominal power of uplink transmissions, one or more values used to determine an uplink sounding reference signal power, and values used in calculating path loss).

At action 618, the UE 601 sends a setup complete message, such as a RRC connection setup complete message, in response to receiving the connection setup message at action 616. The UE 601 may include as part of the setup complete message UE-specific NAS layer information. The setup complete message may also include a NAS message indicating that it is a paging response to the paging signal received so that the core network 611 may handle the call flow correctly.

At action 620, the eNB 605 takes the information from the setup complete message and sends a paging response to the core network 611. For example, the eNB 605 takes the information in the NAS message that indicating this was a paging response and sends the paging response message based on that information (which may be received, e.g., by the MME 206 of FIG. 2).

At action 622, in response to the paging response, the core network 611 establishes a connection between the eNB 605 of the access cell 603 (which the UE 601 had selected for access) and the core network 611 (e.g., the S-GW 208 of FIG. 2).

At action 624, the eNB 605 proceeds with establishing a connection (e.g., a RRC connection) between the eNB 605 of the selected access cell 603 and the UE 601, and the call proceeds.

Figure 7:
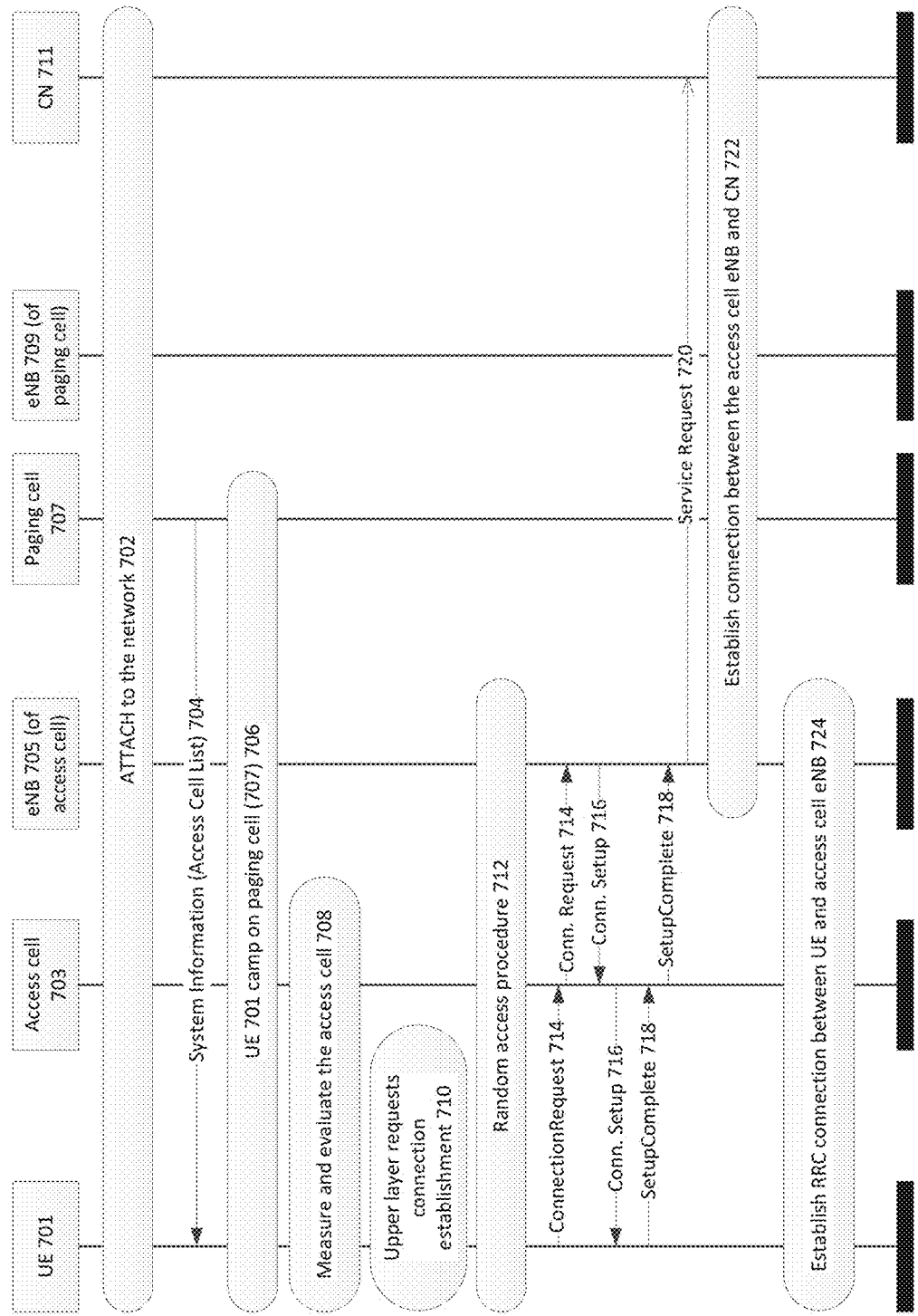
FIG. 7 is a protocol diagram illustrating exemplary signaling aspects between a UE, paging cell, access cell, and core network in accordance with various aspects of the present disclosure.

While FIG. 6 illustrated signaling aspects for a mobile terminated call, FIG. 7 is a protocol diagram illustrating exemplary signaling aspects of a mobile originated call setup between a UE 701, a paging cell 707 (and eNB 709 of paging cell 707), an access cell 703 (and eNB 705 of access cell 703), and core network 711 in accordance with various aspects of the present disclosure. The UE 701 may be, for example, an instance of UE 102, and the eNBs 705 and 709 may be instances of base stations 104 (such as base stations 104e and 104c, respectively).

At action 702, the UE 701 attaches to the core network 711, for example as described above with respect to action 602 of FIG. 6.

At action 704, the UE 701 obtains the system information of the paging cell 707, for example as described above with respect to action 604 of FIG. 6.

At action 706, the UE 701 selects the cell that supports paging service and which meets any other selection criteria, such as discussed above with respect to FIG. 3, and camps on the selected paging cell 707 (while the UE 701 is still in IDLE mode).

At action 708, as the UE 701 is in IDLE mode and camped on the paging cell 707, the UE 701 may measure and evaluate the candidate access cells, for example as described above with respect to action 608 of FIG. 6.

At action 710, an upper layer at the UE 701 requests the establishment of a connection with the eNB 705 (of the access cell 703) and, thereby, the core network 711. Thus, FIG. 7 illustrates call setup signaling for a mobile originated call (e.g., the UE 701 has data it seeks to transmit on its own accord, not in response to a request/paging signal from the core network 711).

At action 712, the UE 701 transitions to connected mode in response to upper layer request and initiates a random access procedure with the eNB 705 of the selected access cell 703, for example as described above with respect to action 612 of FIG. 6.

Actions 714, 716, 718, 720, 722, and 724 may be similar as actions 614, 616, 618, 620, 622, and 624, respectively, described above with respect to FIG. 6, with the difference that instead of the establishment clause in the RRC connection request identifying mobile terminated signaling, it may identify mobile originated signaling. Further, as part of the setup complete message at action 718, the UE 701 may include UE-specific NAS layer information, including a NAS message indicating that it is a service request for the core network 711.

Figure 8:
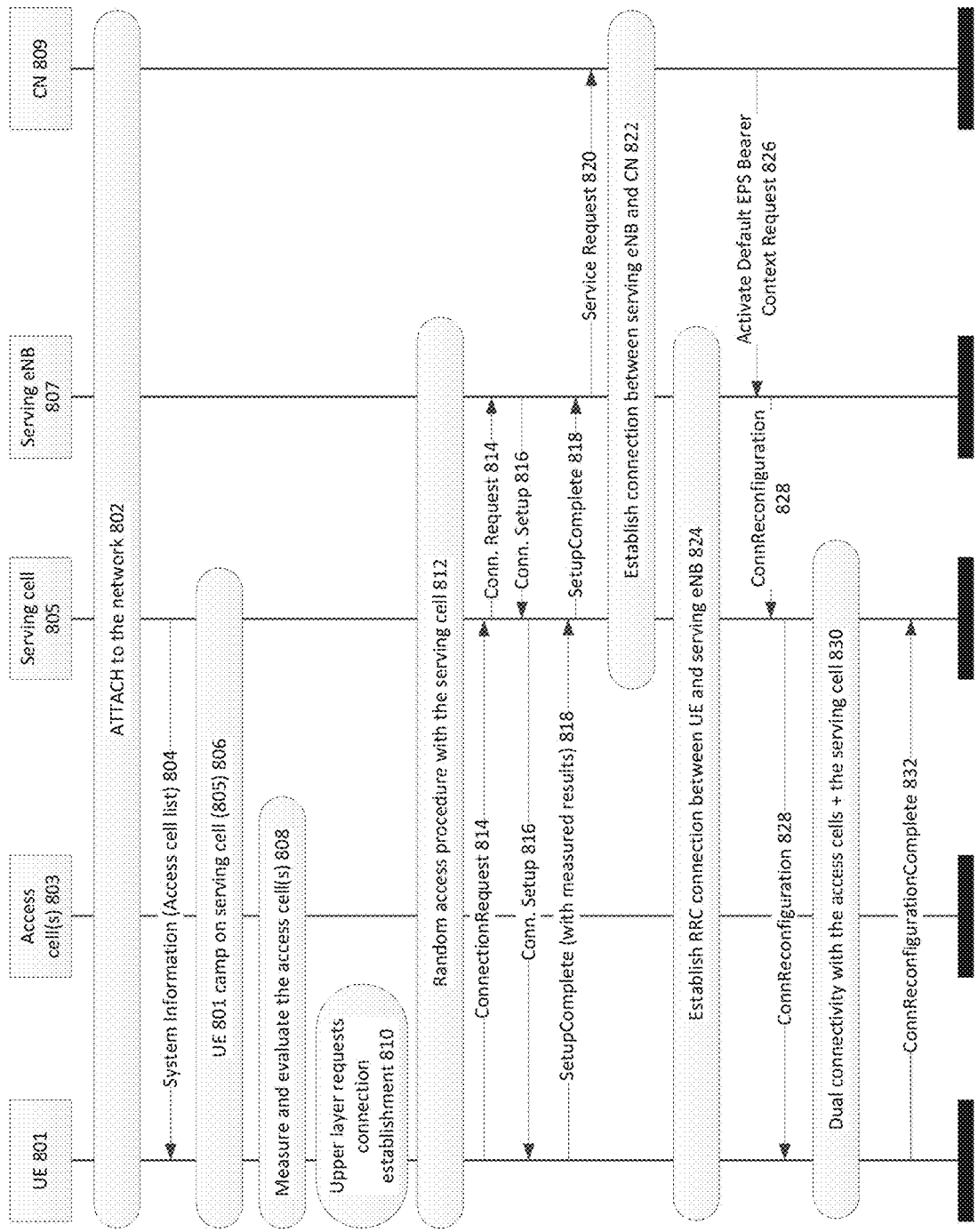
FIG. 8 is a protocol diagram illustrating exemplary signaling aspects between a UE, serving cell, and core network in accordance with various aspects of the present disclosure.

As mentioned above with respect to FIG. 3, embodiments of the present disclosure may speed up the establishment of dual connectivity or carrier aggregation. FIG. 8 is a protocol diagram illustrating exemplary signaling aspects between a UE 801, serving cell 805 (and eNB 807 of serving cell 805), and core network 809 in accordance with various aspects of the present disclosure. The UE 801 may be, for example, an instance of UE 102, and the eNB 807 may be an instance of a base station 104. As illustrated in FIG. 8, the UE 801 has selected the same cell to be the paging cell and access cell (referred to as a serving cell). As will be recognized, the aspects described in FIG. 8 are also applicable to embodiments where the UE 801 selects different cells to function as paging and access cells.

At action 802, the UE 801 attaches to the core network 811, for example as described above with respect to action 602 of FIG. 6.

At action 804, the UE 801 obtains the system information of the serving cell 805, for example as described above with respect to action 604 of FIG. 6 with respect to the paging cell 607.

At action 806, the UE 801 selects the cell that supports paging service and which meets any other selection criteria, such as discussed above with respect to FIG. 3, and camps on the selected serving cell 805 (while the UE 801 is still in IDLE mode).

At action 808, as the UE 801 is in IDLE mode and camped on the serving cell 805, the UE 801 may measure and evaluate the candidate access cells identified in the access cell list, for example as described above with respect to action 608 of FIG. 6. In FIG. 8, the UE 801 selects the eNB 807 to operate as the access cell as well as the paging cell. Measurement and evaluation are still applicable, however, as during reselection procedures that may change.

At action 810, an upper layer at the UE 801 requests the establishment of a connection with the eNB 807 and, thereby, the core network 811. Thus, FIG. 8 also illustrates call setup signaling for a mobile originated call, as in FIG. 7. As will be recognized, embodiments where the call setup signaling is for a mobile terminated call, as in FIG. 6, are also applicable.

Actions 812, 814, 816, 818, 820, 822, and 824 are similar to actions 712, 714, 716, 718, 720, 722, and 724, respectively, described above with respect to FIG. 7 (and, thus, similar as identified to the actions in FIG. 6), with the difference that as part of the setup complete message 818, the UE 801 also includes measured results. For example, the UE 801 may have performed RSRP and RSRQ measurements as part of action 808 and may include these results with the setup complete message at action 818. Alternatively, the UE 801 may send the measurement results by MeasurementReport message. The eNB 807 may in turn forward on the measurement results to the core network 811 for use in establishing dual connectivity or carrier aggregation, alternatively may use the results to determine cells for dual connectivity or carrier aggregation.

At action 826, the core network 811 transmits a context request, such as an activate default EPS bearer context request, to the serving eNB 807. This may originate, for example, from an MME in the core network 811. The context request may include, for example, an EPS bearer ID (which identifies the bearer that needs to be activated), EPS quality of service information (e.g., maximum bit rate for the bearer, a guaranteed bit rate for the bearer, etc.), an access point name, and an assigned PDN IP address.

At action 828, the eNB 807 extracts this information from the context request message. In an embodiment, eNB 807 may access the EPS quality of service information and identify that the level of the quality of service should be met by establishing carrier aggregation or dual connectivity. The eNB 807 compiles the extracted information and forwards aspects of it on to the UE 801 as part of a connection reconfiguration message, for example a RRC connection reconfiguration message. For example, eNB 807 may take the bearer configuration information received as part of the context request message from the core network 811 or as locally determined. The eNB 807 may also determine additional information, including dual connectivity (or carrier aggregation) configuration information (e.g., from a determination based on the quality of service information received), including a RACH preamble assignment for the additional access cell, a C-RNTI, target DRB ID (UL/DL), and target AS security algorithm for the secondary cell that will be providing dual connectivity (or carrier aggregation). The eNB 807 sends the RRCConnectionReconfiguration message, including the EPS bearer configuration from the core network 811 and the dual connectivity configuration information.

At action 830, the UE 801 establishes dual connectivity (or carrier aggregation) with the identified cells (including the serving cell 805 and one or more other access cells, e.g. from the access cell list as determined by the core network 811 or eNB 807 based on the measurement results sent as part of action 818) based on the information included in the connection reconfiguration request received at action 828.

At action 832, the UE 801 uses the assigned resources (e.g., the service cell 805 resources, the dual connectivity resources, or carrier aggregation resources) to transmit a connection reconfiguration complete message back to the serving cell 805, for example a RRCConnectionReconfigurationComplete message.

Figure 9:
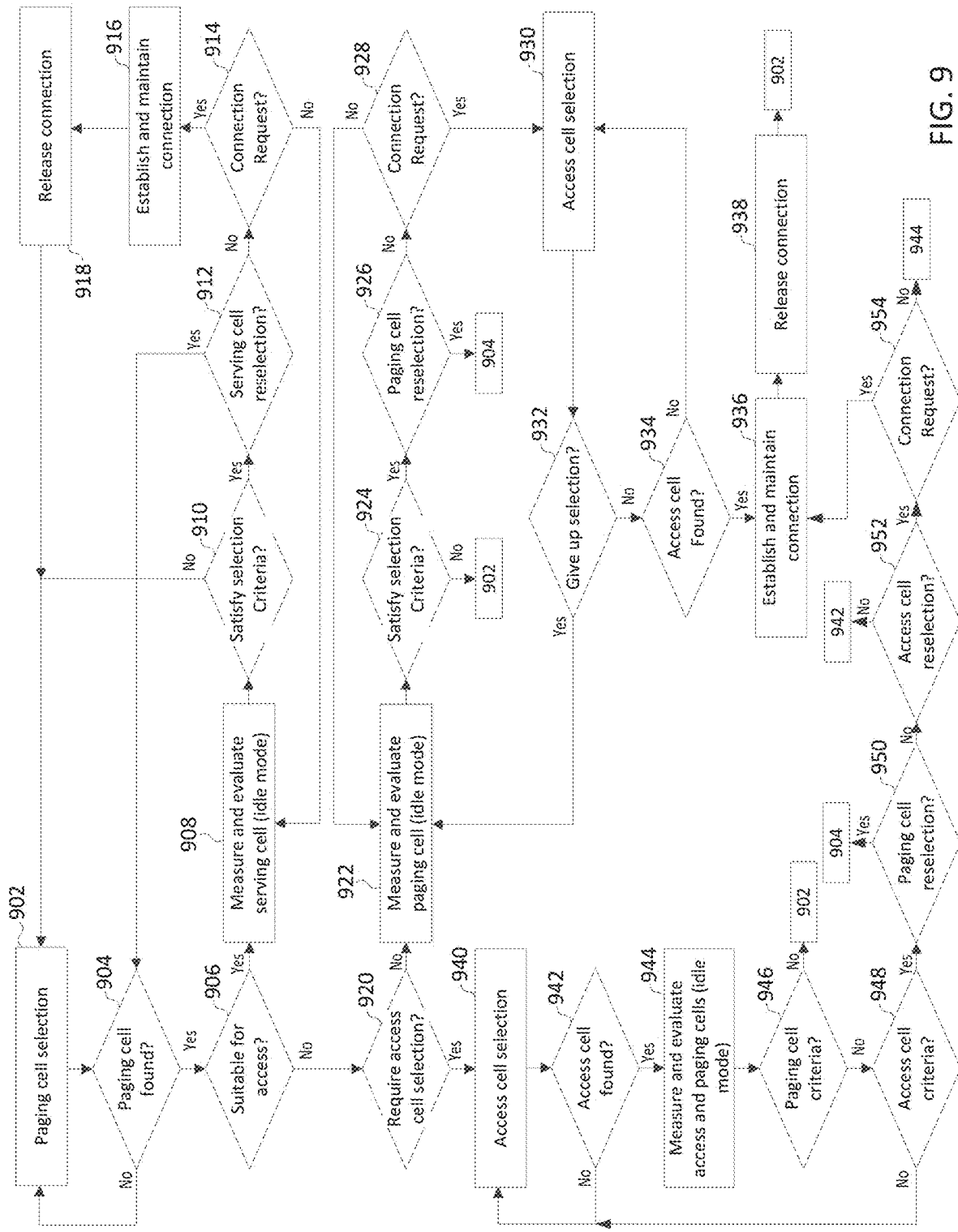
FIG. 9 is a flowchart illustrating an exemplary method for wireless communication in accordance with various aspects of the present disclosure.

Referring now to FIG. 9, shown therein is a flowchart illustrating a method 900 for wireless communication according to aspects of the present disclosure. In particular, the method 900 illustrates the selection of paging and access cells according to embodiments of the present disclosure. Method 900 may be implemented in the UE 102. It is understood that additional steps can be provided before, during, and after the steps of method 900, and that some of the steps described can be replaced or eliminated from the method 900.

At block 902, the UE 102 performs a paging cell selection operation. This may include, for example, the UE 102 (such as via the cell selection module 308 discussed for FIG. 3) analyzing a range of information regarding candidate cells (e.g., the base stations 104 in whose coverage areas the UE 102 currently resides). For example, the UE 102 may measure one or more radio conditions of the different coverage areas, analyze system information about the availability of paging services received from the different base stations 104 (e.g., compare the system information against paging service requirements, such as pertaining to reliability measures, latency measures, coverage area, signal strength, etc.), and select a base station 104 as the paging cell. The UE 102 then camps on the selected paging cell, e.g. while still in IDLE mode.

At decision block 904, the UE 102 determines whether a paging cell has been found (and selected). If not, then the method 900 returns to block 902 to search for and select a paging cell. If a paging cell has been found, the method 900 instead proceeds to decision block 906.

At decision block 906, the UE 102 analyzes the selected paging cell to determine whether it is also suitable to serve as the access cell for the UE 102, for example for one or more specified services. For example, the UE 102 may compare measured and/or reported (e.g., in a system information message from the paging cell) characteristics of the selected paging cell with one or more determined or listed requirements of a service (access service requirements, such as throughput levels, latency measures, reliability measures, and cost estimates) that the UE 102 requires an access cell in which to complete the service, for example as described above with respect to FIG. 3.

If the UE 102 determines that the paging cell is also suitable to serve as the access cell, then the method 900 proceeds to block 908 with the selected paging cell now referred to as a serving cell (since it is selected for both paging and access).

At block 908, the UE 102 measures and evaluates the serving cell while still in IDLE mode. This may involve, for example, any one or more of the measurements described above with respect to FIG. 3.

Decision block 910 takes the results from block 908 and determines whether the serving cell satisfies cell selection criteria (e.g., whether the serving cell meets the criteria for paging service and access service). This may occur, for example, occasionally as the UE 102 is mobile. If not, the method 900 returns to block 902 for paging cell selection. If so, the method 900 proceeds to decision block 912.

At decision block 912, if the UE 102 has moved or the connectivity environment around the UE 102 has otherwise changed, cell reselection may be in order. If cell reselection occurs, then the method 900 returns to decision block 904 and proceeds from there. If cell reselection does not occur, then the method 900 proceeds to decision block 914.

At decision block 914, the UE 102 determines whether a connection establishment request has been received. This may be either mobile terminated (e.g., a paging message as in FIG. 6) or mobile originated (e.g., a connection request as in FIG. 7). If a connection establishment request has not been received, then the method 900 proceeds back to block 908 and proceeds accordingly. If a connection establishment has been received, the UE 102 transitions to connection mode from IDLE mode and the method 900 proceeds to block 916.

At block 916, the UE 102 establishes a connection with the serving cell's base station, for example as described with respect to FIG. 6 or FIG. 7. The UE 102 maintains the connection for a duration of when data is transmitted and/or received according to a specific service that the UE 102 is using.

Once the needs of the service have been met, e.g. all necessary has been transmitted and/or received, at block 918 the UE 102 releases the connection with the base station, the UE 102 transitions again to IDLE mode, and the method 900 returns to block 902 so that the UE 102 may again select a cell as a paging cell on which to camp.

Returning to decision block 906, if the UE 102 instead determines that the paging cell is not suitable to also serve as the access cell, then the method 900 proceeds to decision block 920.

At decision block 920, the UE 102 determines whether the service needs access cell selection at the current time (e.g., while still IDLE with no data to send or paging message received). The service that the UE 102 may need to later engage in, or which the UE 102 has been tasked with, may have a certain range of characteristics, including a level of latency that is tolerable. For example, if the service can tolerate a high level of latency (e.g., a specified threshold amount), then the UE 102 may not need to camp on an access cell before transmission becomes necessary. Otherwise, the UE 102 may camp on an access cell so as to reduce the latency of transmission/reception where low latency is required for the service. Thus, if low latency is not required then the method 900 may proceed to block 922 from decision block 920.

At block 922, the UE 102 measures and evaluates the paging cell while still in IDLE mode. This may involve, for example, any one or more of the measurements described above with respect to FIG. 3.

Decision block 924 takes the results from block 922 and determines whether the paging cell still satisfies paging cell selection criteria. If not, the method 900 returns to block 902 for paging cell selection. If so, the method 900 proceeds to decision block 926.

At decision block 926, if the UE 102 has moved or the connectivity environment around the UE 102 has otherwise changed, paging cell reselection may be in order. If cell reselection occurs, then the method 900 returns to decision block 904 and proceeds from there. If cell reselection does not occur, then the method 900 proceeds to decision block 928.

At decision block 928, the UE 102 determines whether a connection establishment request has been received. This may be either mobile terminated (e.g., a paging message as in FIG. 6) or mobile originated (e.g., a connection request as in FIG. 7). If a connection establishment request has not been received, then the method 900 proceeds back to block 922 and proceeds accordingly. If a connection establishment has been received, the UE 102 transitions to connection mode from IDLE mode and the method 900 proceeds to block 930.

At block 930, the UE 102 performs an access cell selection operation. This may include, for example, the UE 102 (such as via the cell selection module 308 of FIG. 3) analyzing information regarding the candidate cells (e.g. the base stations 104 in whose coverage areas 110 the UE 102 currently resides) pertinent to one or more services associated with the type of connection to be established upon request or need. The access cell selection operation may include evaluation of an access cell list which may include a list of access cells as well as one or more of the following parameters for each access cell: frequency information (e.g., UARFCN), cell identity/zone identity, services available at the access cell, and congestion status/access control information. This may include measuring the different candidate access cells and selecting one cell from the candidates based on the measurements, received information, and comparison of the same against service requirements. The UE 102 then camps on the selected access cell, e.g. while still in IDLE mode and camped on the selected paging cell.

At decision block 932, the UE 102 determines whether it should give up its access cell selection or not. This may occur, for example, where the UE 102 has moved position so that it is no longer within the coverage area of the selected access cell. As noted above, the size of an access cell may be smaller than the size of a paging cell given the different characteristics valued for each (geographic reach versus speed/bandwidth of the connection). Thus, the access cell may need to change even when the paging cell does not. Here, if at decision block 932 the UE 102 determines that the access cell selection should be given up, then the method 900 returns back to block 922 for measurement, evaluation, and selection of another access cell.

If, instead, the UE 102 determines that the access cell selection should not be given up, then the method 900 proceeds to decision block 934. At decision block 934, the UE 102 determines whether an access cell has been found (and selected). If not, then the method 900 returns to block 930 to search for and select an access cell. If an access cell has been found, the method 900 instead proceeds to block 936.

At block 936, the UE 102 establishes a connection with the access cell's base station, for example as described with respect to FIG. 6 or FIG. 7. The UE 102 maintains the connection for a duration of when data is transmitted and/or received according to a specific service that the UE 102 is using.

Once the needs of the service have been met, e.g. all necessary has been transmitted and/or received, at block 938 the UE 102 releases the connection with the base station, the UE 102 transitions again to IDLE mode, and the method 900 returns to block 902 so that the UE 102 may again select a cell as a paging cell on which to camp.

Returning to decision block 920, if low latency is required then the method 900 may proceed to block 940 so that an access cell may be selected and camped on before the actual need for such arises.

At block 940, the UE 102 performs an access cell selection operation as described above with respect to block 930 and FIG. 3.

At decision block 942, the UE 102 determines whether an access cell has been found (and selected). If not, then the method 900 returns to block 940 to search for and select an access cell. If an access cell has been found, the method 900 instead proceeds to block 944.

At block 944, the UE 102 measures and evaluates the selected paging cell and the selected access cell while still in IDLE mode. This may involve, for example, any one or more of the measurements for either cell (or both cells) described above with respect to blocks 908 and/or 922, as well as FIG. 3.

The method 900 proceeds to decision block 946, where the UE 102 determines whether the paging cell still satisfies paging cell selection criteria, based on the results from block 944. If not, the method 900 returns to block 902 for paging cell selection. If so, the method 900 proceeds to decision block 948.

At decision block 948, the UE 102 determines whether the access cell still satisfies the access cell selection criteria, based on the results from block 944. If not, then the method 900 returns to block 940 for access cell selection. If so, then the method 900 proceeds to decision block 950.

At decision block 950, if the UE 102 has moved or the connectivity environment around the UE 102 has otherwise changed, paging cell reselection may be in order. If paging cell reselection occurs, then the method 900 returns to decision block 904 and proceeds from there. If paging cell reselection does not occur, then the method 900 proceeds to decision block 952.

At decision block 952, if the UE 102 has moved or the connectivity environment around the UE 102 has otherwise changed, access cell reselection may be in order. As noted previously, whether a paging cell (or access cell) requires reselection does not necessary determine whether the access cell (or paging cell) also requires reselection. Movement of the UE 102 may require only that the access cell be reselected while the paging cell remains the same, for example. If access cell reselection occurs, then the method 900 returns to decision block 942 and proceeds from there. If access cell reselection does not occur, then the method 900 proceeds to decision block 954.

At decision block 954, the UE 102 determines whether a connection establishment request has been received. This may be either mobile terminated (e.g., a paging message as in FIG. 6) or mobile originated (e.g., a connection request as in FIG. 7). If a connection establishment request has not been received, then the method 900 proceeds back to block 944 and proceeds accordingly. If a connection establishment has been received, the UE 102 transitions to connection mode from IDLE mode and the method 900 proceeds to block 936 and proceeds as described above.

Figure 10:
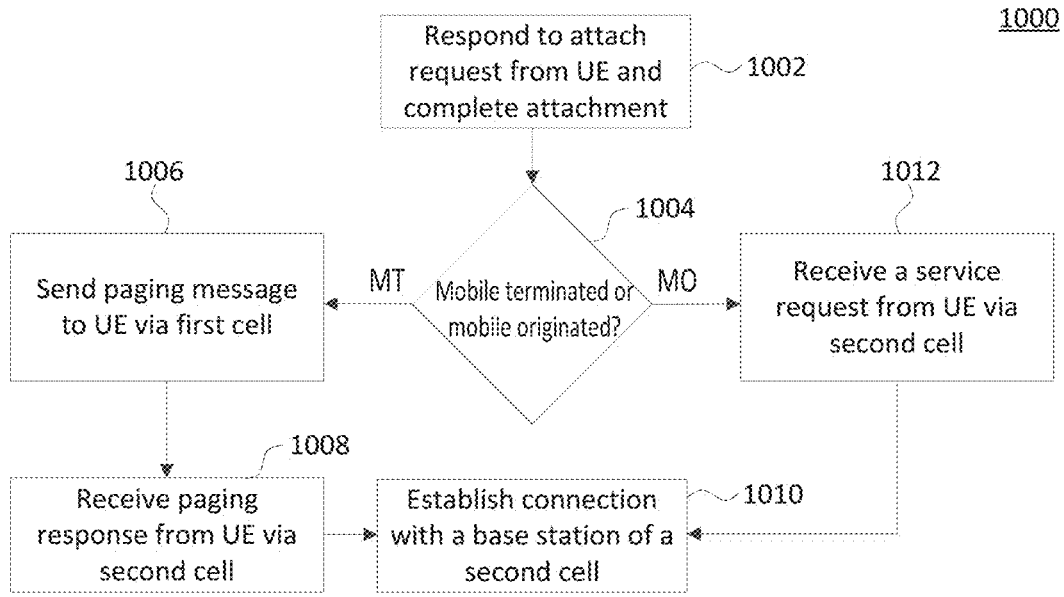
FIG. 10 is a flowchart illustrating an exemplary method for wireless communication in accordance with various aspects of the present disclosure.

Turning now to FIG. 10, shown therein is a flowchart illustrating a method 1000 for wireless communication according to aspects of the present disclosure. In particular, the method 1000 illustrates the interaction of a network with paging and access cells according to embodiments of the present disclosure. Method 1000 may be implemented by elements of the core network 204 as well as an access network including one or more base stations 104 (among other network elements). It is understood that additional steps can be provided before, during, and after the steps of method 1000, and that some of the steps described can be replaced or eliminated from the method 1000.

At block 1002, the network responds to an attach request from a UE 102, as conveyed by a base station, and proceeds with the steps necessary to complete an initial attach (e.g., as discussed above with respect to action 602 of FIG. 6).

Thereafter, the UE 102 may select paging and access cells and camp on one or both of those, pending a need for a specific service.

At decision block 1004, if a mobile terminated call setup is sought, then the method 1000 proceeds to block 1006.

At block 1006, the network sends a paging message to the UE 102 via a first cell. For example, the first cell may be a paging cell that the UE 102 has selected and camped on while in IDLE mode. The paging message may be sent from MME 206 of the core network 204, for example.

At block 1008, the network receives a paging response from the UE 102 via a second cell. For example, the second cell may be an access cell that the UE 102 had previously selected based on the required service, either in response to the paging message (e.g., where high latency is tolerable) or prior to any need. The first and second cells may be different from each other, as described above with respect to the other figures.

At block 1010, the network establishes a connection with a base station of the second cell, for example as discussed above with respect to action 622 of FIG. 6 (mobile terminated) or action 722/822 of FIGS. 7/8 (mobile originated).

Returning to decision block 1004, if a mobile originated call setup occurs, then the method 1000 proceeds to block 1012.

At block 1012, the network receives a service request from the UE 102 via the second cell that the UE 102 selected as access cell. As mentioned with respect to block 1008, the second cell may be an access cell that the UE 102 had previously selected based on the required service, either in response to a connection request from an upper layer of the UE 102 (e.g., where high latency is tolerable) or prior to any connection request.

From block 1012, the method 1000 proceeds to block 1010 as discussed above.

Figure 11:
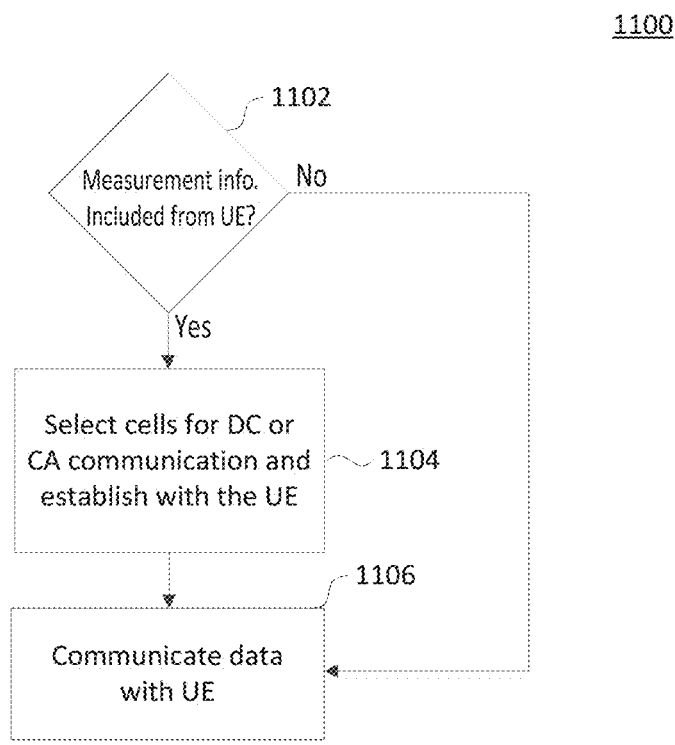
FIG. 11 is a flowchart illustrating an exemplary method for wireless communication for dual connectivity or carrier aggregation in accordance with various aspects of the present disclosure.

Turning now to FIG. 11, shown therein is a flowchart illustrating a method 1100 for wireless communication according to aspects of the present disclosure. In particular, the method 1100 illustrates the interaction of a network with paging and access cells for carrier aggregation and/or dual connectivity according to embodiments of the present disclosure. Method 1100 may be implemented by elements of the core network 204 as well as an access network including one or more base stations 104 (among other network elements). It is understood that additional steps can be provided before, during, and after the steps of method 1100, and that some of the steps described can be replaced or eliminated from the method 1100.

At decision block 1102, the network determines whether measurement information was included with a paging response/service request from the UE 102 (and forwarded on by the second cell's base station). This is pertinent in embodiments where the network seeks to establish dual connectivity or carrier aggregation faster than is currently available (for example, by one or more elements of a radio access network aspect of the network). If measurement information was included, then the method 1100 proceeds to block 1104.

At block 1104, the network selects one or more additional cells (e.g., other cells that are available as access cells, and that meet the requirements for the service occurring) for dual connectivity or carrier aggregation. The network then proceeds to establish the dual connectivity or carrier aggregation with the UE 102, for example as described above with respect to actions 826, 828, 830, and 832 of FIG. 8 above.

At block 1106, the network communicates data with the UE 102 via the second cell (and additional cell(s) where dual connectivity or carrier aggregation is established), for example transmitting and/or receiving data according to the requirements of the given service that is currently being used by the UE 102.

Returning to decision block 1102, if measurement information was not included from the UE 102, then the method 1100 proceeds directly to block 1106 for communication with the UE 102.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a computer-readable medium having program code recorded thereon, the program code comprising code for causing a user equipment (UE) to determine a paging service requirement and an access service requirement for a service to use in communication with a network. The program code further comprises code for causing the UE to select a first cell through which the UE receives paging service from a base station based on the paging service requirement. The program code further comprises code for causing the UE to select a second cell through which the UE obtains the service based on the access service requirement.

The computer-readable medium further includes wherein the paging service requirement comprises an ability to receive a paging message, and the code for causing the UE to select the first cell further comprising code for causing the UE to determine whether the first cell is capable of receiving the paging service from the network. The computer-readable medium further includes code for causing the UE to connect to the second cell for the service in response to a request for network access for the service. The computer-readable medium further includes code for causing the UE to determine, as part of the determination of the access service requirement, a latency tolerance of the service. The computer-readable medium further includes code for causing the UE to delay selection of the second cell until immediately prior to a connection establishment attempt between the UE and the network in response to the determined latency tolerance being above a threshold. The computer-readable medium further includes code for causing the UE to proceed with the selection of the second cell while the UE is in an idle mode in response to the determined latency tolerance being at or below the threshold. The computer-readable medium further includes code for causing the UE to determine whether the first cell satisfies the access service requirement to support the UE accessing the network via the first cell for the service. The computer-readable medium further includes wherein the second cell and the first cell selected are the same in response to the first cell satisfying the access service requirement, and the second cell is different from the first cell selected in response to the first cell not satisfying the access service requirement. The computer-readable medium further includes wherein the code for causing the UE to determine whether the first cell satisfies the access service requirement further comprises code for causing the UE to determine a radio access technology (RAT) type and a frequency of the cell and code for causing the UE to compare the RAT type and the frequency of the cell with the access service requirement of the UE. The computer-readable medium further includes code for causing the UE to select the first cell through which to receive the paging service based on a reliability level of the first cell, the reliability level of the first cell being greater than the reliability level of the second cell. The computer-readable medium further includes code for causing the UE to select the second cell through which to access the network based on a throughput level of the second cell, the throughput level of the second cell being greater than the throughput level of the first cell. The computer-readable medium further includes code for causing the UE to reselect a third cell in place of the second cell through which to access the network based on a change in location of the UE in relation to the second cell. The computer-readable medium further includes code for causing the UE to maintain the first cell through which the UE receives the paging service during the reselecting. The computer-readable medium further includes code for causing the UE to reselect a third cell in place of the first cell through which to receive the paging service based on a change in location of the UE in relation to the first cell. The computer-readable medium further includes code for causing the UE to maintain the second cell through which to access the network during the reselecting. The computer-readable medium further includes code for causing the UE to select the first cell from a first radio access technology (RAT) network, and code for causing the UE to select the second cell from a second RAT network, the second RAT network being different from the first RAT network. The computer-readable medium further includes code for causing the UE to measure a characteristic of the second cell prior to selecting the second cell through which to obtain the service from the network. The computer-readable medium further includes code for causing the UE to measure a plurality of cells to obtain measurement information about suitability of each of the plurality of cells as an access cell for the UE. The computer-readable medium further includes code for causing the UE to send the measurement information to the network during establishment of a connection between the UE and the network via the second cell. The computer-readable medium further includes code for causing the UE to establish, with the network, a dual connectivity or carrier aggregation connection with the network via the second cell and a third cell based on the measurement information sent to the network. The computer-readable medium further includes code for causing the UE to measure a plurality of cells to obtain measurement information about suitability of each of the plurality of cells as an access cell for the UE. The computer-readable medium further includes code for causing the UE to send the measurement information to the network after establishment of a connection between the UE and the network via the second cell. The computer-readable medium further includes code for causing the UE to establish, with the network, a dual connectivity or carrier aggregation connection with the network via the second cell and a third cell based on the measurement information sent to the network. The computer-readable medium further includes wherein the code for causing the UE to select the first cell further comprises code for causing the UE to receive paging cell information for the first cell from the network, the paging cell information comprising at least one of a macro cell indication, cell coverage information, and paging availability information, and code for causing the UE to select the first cell based on the received paging cell information satisfying the paging service requirement. The computer-readable medium further includes wherein the code for causing the UE to select the second cell further comprises code for causing the UE to receive access control information for the second cell from the network, the access control information comprising at least one of an accessible cell list for the service and access control information of neighboring cells for the service, and code for causing the UE to select the second cell based on the received access control information satisfying the access service requirement. The computer-readable medium further includes wherein the access control information further comprises barring information that has a barring rate assigned per cell, frequency, or frequency band, the code for causing the UE to select the second cell further comprising code for causing the UE to compare the barring rate to a random number drawn by the UE at an access attempt, and code for causing the UE to determine whether the UE can select at least one of the cell, frequency, and frequency band to access the network based on the comparing. The computer-readable medium further includes wherein the access control information further comprises barring information that has a barring rate assigned per cell, frequency, or frequency band, the barring information being defined per access class or service, the code for causing the UE to select the second cell further comprising code for causing the UE to compare a barring rate associated with an access class assigned to the UE or with a service selected by the UE to a random number drawn by the UE at an access attempt, and code for causing the UE to determine whether the UE can select at least one of the cell, frequency, and frequency band to access the network based on the comparing. The computer-readable medium further includes wherein the service is active on the UE during the determining and selecting, the paging service requirement and the access service requirement being determined based on the active service. The computer-readable medium further includes wherein the service is inactive during the determining and selecting, further comprising code for causing the UE to select first and second cells to support the paging service requirement and the access service requirement by default while the service is inactive.

Embodiments of the present disclosure further include a computer-readable medium having program code recorded thereon, the program code comprising code for causing a network to send a paging signal to a user equipment (UE) via first cell on which the UE is camped. The program code further comprises code for causing the network to receive a paging response from the UE via a second cell on which the UE is camped in response to the paging signal received via the first cell, the second cell being different from the first cell. The program code further comprises code for causing the network to establish a data connection with the second cell in response to the received paging response to communicate with the UE via the second cell.

The computer-readable medium further includes wherein the code for causing the network to send the paging signal further comprises code for causing a mobility management entity of the network to send the paging signal. The computer-readable medium further includes wherein the code for causing the network to receive the paging response further comprises code for causing the mobility management entity of the network to receive the paging response, wherein the data connection is established between a base station of the second cell and a serving gateway of the network. The computer-readable medium further includes wherein the code for causing the network to send the paging signal further comprises code for causing the network to send the paging signal to base stations within a tracking area for the UE, wherein the first cell is a cell located within the tracking area. The computer-readable medium further includes wherein the first cell is part of a first radio access radio access technology (RAT) network, and the second cell is part of a second RAT network, the second RAT network being different from the first RAT network. The computer-readable medium further includes code for causing the network to send a second paging signal to the UE via the first cell on which the UE is camped, and code for causing the network to receive a second paging response from the UE via a third cell on which the UE is camped after a change in a position of the UE in response to the second paging signal received via the first cell, the third cell being different from the second cell. The computer-readable medium further includes wherein the code for causing the network to establish the data connection further comprises code for causing the network to receive, from the UE via the second cell, a connection setup completion notification that comprises measurements of a plurality of access cells accessible by the UE, the second cell being among the plurality of access cells. The computer-readable medium further includes code for causing the network to select a third cell from among the plurality of access cells to provide carrier aggregation in communications with the UE, and code for causing the network to send carrier aggregation configuration information for the second and third cells to the UE. The computer-readable medium further includes code for causing the network to select a third cell from among the plurality of access cells to provide dual connectivity in communications with the UE, and code for causing the network to send dual connectivity configuration information for the second and third cells to the UE.

Embodiments of the present disclosure further include an apparatus comprising means for determining, by a user equipment (UE), a paging service requirement and an access service requirement for a service to use in communication with a network. The apparatus further comprises means for selecting, by the UE, a first cell through which the UE receives a paging service from a base station based on the paging service requirement. The apparatus further comprises means for selecting, by the UE, a second cell through which the UE obtains the service based on the access service requirement.

The apparatus further includes wherein the paging service requirement comprises an ability to receive a paging message, the means for selecting the first cell further comprising means for determining whether the first cell is capable of receiving the paging service from the network. The apparatus further includes means for connecting, by the UE, to the second cell for the service in response to a request for network access for the service. The apparatus further includes wherein the means for determining the access service requirement further comprises means for determining, by the UE, a latency tolerance of the service, means for delaying, by the UE, selection of the second cell until immediately prior to a connection establishment attempt between the UE and the network in response to the determined latency tolerance being above a threshold, and means for proceeding, by the UE, with the selection of the second cell while the UE is in an idle mode in response to the determined latency tolerance being at or below the threshold. The apparatus further includes means for determining, by the UE, whether the first cell satisfies the access service requirement to support the UE accessing the network via the first cell for the service, wherein the second cell and the first cell selected are the same in response to the first cell satisfying the access service requirement, and wherein the second cell is different from the first cell selected in response to the first cell not satisfying the access service requirement. The apparatus further includes wherein the means for determining whether the first cell satisfies the access service requirement further comprises means for determining a radio access technology (RAT) type and a frequency of the cell, and means for comparing the RAT type and the frequency of the cell with the access service requirement of the UE. The apparatus further includes means for selecting, by the UE, the first cell through which to receive the paging service based on a reliability level of the first cell, the reliability level of the first cell being greater than the reliability level of the second cell, and means for selecting, by the UE, the second cell through which to access the network based on a throughput level of the second cell, the throughput level of the second cell being greater than the throughput level of the first cell. The apparatus further includes means for reselecting, by the UE, a third cell in place of the second cell through which to access the network based on a change in location of the UE in relation to the second cell, and means for maintaining, by the UE, the first cell through which the UE receives the paging during the reselecting. The apparatus further includes means for reselecting, by the UE, a third cell in place of the first cell through which to receive the paging service based on a change in location of the UE in relation to the first cell, and means for maintaining, by the UE, the second cell through which to access the network during the reselecting. The apparatus further includes means for selecting the first cell from a first radio access technology (RAT) network, and means for selecting the second cell from a second RAT network, the second RAT network being different from the first RAT network. The apparatus further includes means for measuring, by the UE, a characteristic of the second cell prior to selecting the second cell through which to obtain the service from the network. The apparatus further includes means for measuring, by the UE, a plurality of cells to obtain measurement information about suitability of each of the plurality of cells as an access cell for the UE, means for sending the measurement information to the network during establishment of a connection between the UE and the network via the second cell, and means for establishing, with the network, a dual connectivity or carrier aggregation connection with the network via the second cell and a third cell based on the measurement information sent to the network. The apparatus further includes means for measuring, by the UE, a plurality of cells to obtain measurement information about suitability of each of the plurality of cells as an access cell for the UE, means for sending the measurement information to the network after establishment of a connection between the UE and the network via the second cell, and means for establishing, with the network, a dual connectivity or carrier aggregation connection with the network via the second cell and a third cell based on the measurement information sent to the network. The apparatus further includes wherein the means for selecting the first cell further comprises means for receiving paging cell information for the first cell from the network, the paging cell information comprising at least one of a macro cell indication, cell coverage information, and paging availability information, and means for selecting the first cell based on the received paging cell information satisfying the paging service requirement. The apparatus further includes wherein the means for selecting the second cell further comprises means for receiving access control information for the second cell from the network, the access control information comprising at least one of an accessible cell list for the service and access control information of neighboring cells for the service, and means for selecting the second cell based on the received access control information satisfying the access service requirement. The apparatus further includes wherein the access control information further comprises barring information that has a barring rate assigned per cell, frequency, or frequency band, the means for selecting the second cell further comprising means for comparing, by the UE, the barring rate to a random number drawn by the UE at an access attempt, and means for determining, by the UE, whether the UE can select at least one of the cell, frequency, and frequency band to access the network based on the comparing. The apparatus further includes wherein the access control information further comprises barring information that has a barring rate assigned per cell, frequency, or frequency band, the barring information being defined per access class or service, the means for selecting the second cell further comprising means for comparing, by the UE, a barring rate associated with an access class assigned to the UE or with a service selected by the UE to a random number drawn by the UE at an access attempt, and means for determining, by the UE, whether the UE can select at least one of the cell, frequency, and frequency band to access the network based on the comparing. The apparatus further includes wherein the service is active on the UE during the determining and selecting, the paging service requirement and the access service requirement being determined based on the active service. The apparatus further includes wherein the service is inactive during the determining and selecting, and the UE is configured to select first and second cells to support the paging service requirement and the access service requirement by default while the service is inactive.

Embodiments of the present disclosure further include a network system comprising means for sending, from the network system, a paging signal to a user equipment (UE) via first cell on which the UE is camped. The network system further comprises means for receiving, at the network system, a paging response from the UE via a second cell on which the UE is camped in response to the paging signal received via the first cell, the second cell being different from the first cell. The network system further comprises means for establishing, by the network system, a data connection with the second cell in response to the received paging response to communicate with the UE via the second cell.

The network system further includes wherein the means for sending further comprises means for sending the paging signal from a mobility management entity of the network system. The network system further includes wherein the means for receiving further comprises means for receiving the paging response at the mobility management entity of the network system, wherein the data connection is established between a base station of the second cell and a serving gateway of the network system. The network system further includes wherein the means for sending further comprises means for sending the paging signal to base stations within a tracking area for the UE, wherein the first cell is a cell located within the tracking area. The network system further includes wherein the first cell is part of a first radio access radio access technology (RAT) network, and the second cell is part of a second RAT network, the second RAT network being different from the first RAT network. The network system further includes means for sending, from the network system, a second paging signal to the UE via the first cell on which the UE is camped, and means for receiving, at the network system, a second paging response from the UE via a third cell on which the UE is camped after a change in a position of the UE in response to the second paging signal received via the first cell, the third cell being different from the second cell. The network system further includes wherein the establishing the data connection further comprises means for receiving, from the UE via the second cell, a connection setup completion notification that comprises measurements of a plurality of access cells accessible by the UE, the second cell being among the plurality of access cells. The network system further includes means for selecting, by the network system, a third cell from among the plurality of access cells to provide carrier aggregation in communications with the UE, and means for sending, from the network system, carrier aggregation configuration information for the second and third cells to the UE. The network system further includes means for selecting, by the network system, a third cell from among the plurality of access cells to provide dual connectivity in communications with the UE, and means for sending, from the network system, dual connectivity configuration information for the second and third cells to the UE.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method, comprising:
   determining, by a user equipment (UE), a first requirement comprising at least one of reliability, latency, power, or coverage for receiving a page;
   determining, by the UE, a second requirement based on a service selected by the UE to use in communication with a network, the service being available to receive or transmit data and the second requirement comprising a latency tolerance of the service;
   selecting, by the UE, a first frequency band to receive paging service from a base station based on the first requirement; and
   delaying, by the UE, selection of a second frequency band on which the UE obtains the service based on the second requirement until a connection establishment attempt between the UE and the network in response to the latency tolerance being above a threshold.

2. The method of claim 1, further comprising:
   proceeding, by the UE, with the selection of the second frequency band based on the second requirement while the UE is in an idle mode in response to the latency tolerance being at or below the threshold.

3. The method of claim 1, further comprising:
   determining, by the UE, whether the first frequency band satisfies the second requirement to support the UE accessing the network via the first frequency band for the service,
   wherein the second frequency band is different from the first frequency band selected in response to the first frequency band not satisfying the access service requirement.

4. The method of claim 1, further comprising:
   selecting, by the UE, the second frequency band through which to access the network based on a throughput level of the second frequency band, the throughput level of the second frequency band being greater than the throughput level of the first frequency band and the second frequency band comprising a higher frequency than the first frequency band.

5. The method of claim 1, further comprising:
   reselecting, by the UE, a third frequency band in place of the second frequency band through which to access the network based on a change in location of the UE; and
   maintaining, by the UE, the first frequency band through which the UE receives the page during the reselecting.

6. The method of claim 1, further comprising:
   measuring, by the UE, a plurality of cells to obtain measurement information about suitability of each of the plurality of cells as an access cell for the UE;
   sending the measurement information to the network during establishment of a connection between the UE and the network via the second frequency band; and
   establishing, with the network, a dual connectivity or carrier aggregation connection with the network via the second frequency band and a third frequency band based on the measurement information sent to the network.

7. The method of claim 1, wherein the selecting the second frequency band further comprises:
   receiving access control information for the second frequency band from the network, the access control information comprising at least one of an accessible cell list for the service and access control information of neighboring cells for the service; and selecting the second frequency band based on the received access control information satisfying the second requirement.

8. The method of claim 1, wherein:
the second requirement comprises at least one of throughput, latency, reliability, or cost.

9. A method, comprising:
determining, by a user equipment (UE), a first requirement comprising at least one of reliability, latency, power, or coverage for receiving a page;
determining, by the UE, a second requirement based on a service selected by the UE to use in communication with a network, the service being available to receive or transmit data;
selecting, by the UE, a first cell to receive paging service from a base station based on the first requirement;
measuring, by the UE in response to the selecting the first cell, a plurality of cells including the first cell to obtain measurement information about suitability of each of the plurality of cells as an access cell for the UE;
selecting, by the UE, a second cell through which the UE obtains the service based on the second requirement;
sending, by the UE, the measurement information to the network during establishment of a connection between the UE and the network via the second cell; and
establishing, by the UE, a multiple cell connection with the network via the second cell and a third cell based on the measurement information sent to the network.

10. The method of claim 9, wherein the multiple cell connection comprises a dual connectivity connection.

11. The method of claim 9, wherein the multiple cell connection comprises a carrier aggregation connection.

12. The method of claim 9, wherein:
the first cell is part of a first radio access radio access technology (RAT) network; and
second cell is part of a second RAT network, the second RAT network being different from the first RAT network.

13. The method of claim 9, wherein the second requirement comprises a latency tolerance of the service, the method further comprising:
delaying, by the UE, selection of the second cell until a connection establishment attempt between the UE and the network in response to the latency tolerance being above a threshold; and
proceeding, by the UE, with the selection of the second cell while the UE is in an idle mode in response to the latency tolerance being at or below the threshold.

14. The method of claim 9, wherein the sending further comprises:
including, by the UE, the measurement information with a completion message that is sent to the network.

15. The method of claim 9, further comprising:
reselecting, by the UE, a third cell in place of the second cell through which to access the network based on a change in location of the UE; and
maintaining, by the UE, the first cell through which the UE receives the page during the reselecting.

16. An apparatus, comprising:
a processor configured to:
determine a first requirement comprising at least one of reliability, latency, power, or coverage for receiving a page;
determine a second requirement based on a service selected by the apparatus to use in communication with a network, the service being available to receive or transmit data and the second requirement comprising a latency tolerance of the service;
select a first frequency band to receive paging service from a base station based on the first requirement; and
delay selection of a second frequency band on which the apparatus obtains the service based on the second requirement until a connection establishment attempt between the apparatus and the network in response to the latency tolerance being above a threshold.

17. The apparatus of claim 16, wherein the processor is further configured to:
proceed with the selection of the second frequency band based on the second requirement while the apparatus is in an idle mode in response to the latency tolerance being at or below the threshold.

18. The apparatus of claim 16, wherein the processor is further configured to:
determine whether the first frequency band satisfies the second requirement to support the apparatus accessing the network via the first frequency band for the service, wherein the second frequency band is different from the first frequency band selected in response to the first frequency band not satisfying the access service requirement.

19. The apparatus of claim 16, wherein the processor is further configured to:
select the second frequency band through which to access the network based on a throughput level of the second frequency band, the throughput level of the second frequency band being greater than the throughput level of the first frequency band and the second frequency band comprising a higher frequency than the first frequency band.

20. The apparatus of claim 16, wherein the processor is further configured to:
reselect a third frequency band in place of the second frequency band through which to access the network based on a change in location of the apparatus; and
maintain the first frequency band through which the apparatus receives the page during the reselecting.

21. The apparatus of claim 16, further comprising a transceiver configured to:
measure a plurality of cells to obtain measurement information about suitability of each of the plurality of cells as an access cell for the apparatus;
send the measurement information to the network during establishment of a connection between the apparatus and the network via the second frequency band; and
establish, with the network, a dual connectivity or carrier aggregation connection with the network via the second frequency band and a third frequency band based on the measurement information sent to the network.

22. The apparatus of claim 16, wherein:
the apparatus further comprises a transceiver configured to receiving access control information for the second frequency band from the network, the access control information comprising at least one of an accessible cell list for the service and access control information of neighboring cells for the service; and
the processor is further configured to select the second frequency band based on the received access control information satisfying the second requirement.

23. The apparatus of claim 16, wherein:
the second requirement comprises at least one of throughput, latency, reliability, or cost.

24. An apparatus, comprising:
a processor configured to:
 determine a first requirement comprising at least one of reliability, latency, power, or coverage for receiving a page;
 determine a second requirement based on a service selected by the apparatus to use in communication with a network, the service being available to receive or transmit data; and
 select a first cell to receive paging service from a base station based on the first requirement;
a transceiver configured to:
 measure, in response to the selection of the first cell, a plurality of cells including the first cell to obtain measurement information about suitability of each of the plurality of cells as an access cell for the apparatus, wherein the processor is further configured to select a second cell through which the apparatus obtains the service based on the second requirement;
 send the measurement information to the network during establishment of a connection between the apparatus and the network via the second cell; and
 establish a multiple cell connection with the network via the second cell and a third cell based on the measurement information sent to the network.

25. The apparatus of claim 24, wherein the multiple cell connection comprises a dual connectivity connection.

26. The apparatus of claim 24, wherein the multiple cell connection comprises a carrier aggregation connection.

27. The apparatus of claim 24, wherein:
 the first cell is part of a first radio access radio access technology (RAT) network; and
 second cell is part of a second RAT network, the second RAT network being different from the first RAT network.

28. The apparatus of claim 24, wherein the second requirement comprises a latency tolerance of the service, the processor further configured to:
 delay selection of the second cell until a connection establishment attempt between the apparatus and the network in response to the latency tolerance being above a threshold; and
 proceed with the selection of the second cell while the apparatus is in an idle mode in response to the latency tolerance being at or below the threshold.

29. The apparatus of claim 24, wherein the transceiver is further configured to:
 include the measurement information with a completion message that is sent to the network.

30. The apparatus of claim 24, wherein the processor is further configured to:
 reselect a third cell in place of the second cell through which to access the network based on a change in location of the apparatus; and
 maintain the first cell through which the apparatus receives the page during the reselection.

* * * * *